US011745548B2

(12) United States Patent
Mizrachi et al.

(10) Patent No.: US 11,745,548 B2
(45) Date of Patent: Sep. 5, 2023

(54) ESTIMATING AN EFFECTIVE RADIUS OF A TIRE OF A VEHICLE

(71) Applicant: Tactile Mobility Ltd., Haifa (IL)

(72) Inventors: Boaz Mizrachi, Haifa (IL); Hanan Caspi, Haifa (IL); Stas Shapira, Haifa (IL)

(73) Assignee: Tactile Mobility Ltd., Haifa (IL)

( * ) Notice: Subject to any disclaimer, the term of this patent is extended or adjusted under 35 U.S.C. 154(b) by 0 days.

(21) Appl. No.: 17/821,769

(22) Filed: Aug. 23, 2022

(65) Prior Publication Data

US 2023/0173851 A1 Jun. 8, 2023

Related U.S. Application Data

(63) Continuation-in-part of application No. PCT/IB2021/051794, filed on Mar. 4, 2021.
(Continued)

(51) Int. Cl.
*B60C 11/24* (2006.01)

(52) U.S. Cl.
CPC .................. *B60C 11/246* (2013.01)

(58) Field of Classification Search
CPC ............ B60C 23/0408; B60C 23/0496; B60C 23/061; B60C 23/0494; B60C 23/0416; B60C 23/0433; B60C 23/0493; B60C 19/00; B60C 23/04; B60C 23/041; B60C 23/20; B60C 23/0411; B60C 23/0462; B60C 23/0444; B60C 23/0479; B60C 23/064; B60C 11/24; B60C 23/007; B60C 23/062; B60C 23/0488; B60C 23/0401; B60C 23/0413; B60C 23/06;
(Continued)

(56) References Cited

U.S. PATENT DOCUMENTS 8,903,593 B1 12/2014 Addepalli et al.
2004/0225423 A1* 11/2004 Carlson ................. B60C 23/061
701/31.4
(Continued)

FOREIGN PATENT DOCUMENTS

CN 105021384 A 11/2015
EP 2722202 A1 * 4/2014 ......... B60C 23/0488
(Continued)

*Primary Examiner* — Andre J Allen
(74) *Attorney, Agent, or Firm* — Reches Patents

(57) ABSTRACT

A method for estimating an effective radius of a tire of a vehicle, the method may include (i) obtaining sensed information that reflects (a) a distance passed by the vehicle during one or more driving sessions, (b) a rotational speed of at least a wheel that comprises the tire during the one or more driving sessions, (c) values of tire radius affecting parameters during the one or more driving sessions, wherein the tire radius affecting parameters comprise a vehicle speed and at least some other tire radius affecting parameters; (ii) selecting at least one portion of the one or more driving sessions; and (iii) determining the effective radius of the tire of the vehicle based on (a) sensed information gained during the at least one portion, the sensed information comprises values of the tire radius affecting parameters during the at least one portion, and (b) one or more relationships between the effective radius of the tire and tire radius affecting parameters.

20 Claims, 15 Drawing Sheets

Related U.S. Application Data

(60) Provisional application No. 63/260,907, filed on Sep. 3, 2021, provisional application No. 62/985,899, filed on Mar. 6, 2020, provisional application No. 62/985,894, filed on Mar. 6, 2020.

(58) Field of Classification Search
CPC . B60C 23/043; B60C 23/0452; B60C 11/246; B60C 23/0467; B60C 23/0498; B60C 23/02; B60C 99/006; B60C 23/0428; B60C 23/0442; B60C 2019/004; B60C 23/009; B60C 23/0425; B60C 11/243; B60C 23/004; B60C 23/00354; B60C 23/045; B60C 23/0464; B60C 23/003; B60C 23/00318; B60C 23/0472; B60C 23/066; B60C 23/00372; B60C 23/0403; B60C 23/04985; B60C 23/0406; B60C 29/02; B60C 11/00; B60C 23/006; B60C 23/00; B60C 23/044; B60C 23/008; B60C 23/0455; B60C 23/0454; B60C 23/0483; B60C 23/0461; B60C 23/0474; B60C 23/0415; B60C 23/0491; B60C 23/0489; B60C 25/002; B60C 29/064; B60C 23/00363; B60C 23/0481; B60C 11/0318; B60C 23/0459; B60C 23/0471; B60C 2019/005; B60C 23/002; B60C 23/042; B60C 2200/02; B60C 23/0422; B60C 23/0423; B60C 23/0466; B60C 23/0477; B60C 13/001; B60C 23/0405; B60C 29/06; B60C 23/0437; B60C 23/0476; B60C 23/0447; B60C 25/132; B60C 23/0449; B60C 23/0427; B60C 25/00; B60C 9/18; B60C 23/0484; B60C 13/00; B60C 19/003; B60C 23/0486; B60C 23/065; B60C 23/00336; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0457; B60C 25/18; B60C 11/13; B60C 23/0418; B60C 23/0469; B60C 23/12; B60C 29/066; B60C 23/068; B60C 25/005; B60C 25/138; B60C 99/00; B60C 11/03; B60C 23/005; B60C 23/0432; B60C 25/007; B60C 3/00; B60C 5/14; B60C 11/11; B60C 17/04; B60C 17/06; B60C 23/063; B60C 23/10; B60C 25/0554; B60C 25/14; B60C 29/062; B60C 99/003; B60C 11/032; B60C 11/12; B60C 13/003; B60C 19/001; B60C 23/0435; B60C 23/126; B60C 23/127; B60C 23/16; B60C 29/068; B60C 3/04; B60C 9/20; B60C 11/01; B60C 11/0302; B60C 13/02; B60C 15/06; B60C 25/056; B60C 29/005; B60C 29/04; B60C 5/142; B60C 11/0304; B60C 11/0306; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/131; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 2015/0617; B60C 2015/0678; B60C 2200/04; B60C 23/085; B60C 25/0548; B60C 25/185; B60C 7/107; B60C 9/22

USPC .................................................. 73/146–146.8
See application file for complete search history.

(56) References Cited

U.S. PATENT DOCUMENTS

| | | |
|---|---|---|
| 2012/0109415 A1 | 5/2012 | Nitta et al. |
| 2014/0309805 A1 | 10/2014 | Ricci |
| 2016/0114643 A1 | 4/2016 | Anderson et al. |
| 2018/0134106 A9 | 5/2018 | Anderson et al. |
| 2019/0329620 A1 | 10/2019 | Rogers |
| 2022/0153070 A1* | 5/2022 | Singuru .............. B60C 23/061 |
| 2023/0070044 A1* | 3/2023 | Nishiyama ............ G01M 17/02 |

FOREIGN PATENT DOCUMENTS

| | | | | |
|---|---|---|---|---|
| EP | 3121034 A1 * | 1/2017 | .......... | B60C 11/243 |
| JP | 3702816 B2 | 10/2005 | | |
| KR | 100784277 B1 * | 12/2007 | ............. | G01M 1/14 |

* cited by examiner

| Monitoring during duration of life of vehicle forces (amplitude and direction) applied on the chassis 3312 |
|---|

↓

| Generating a map or other representation of the aggregate events 3314 |
|---|

Monitoring during duration of life of vehicle events that reduce the lifespan of the motor
3332

Generating a representation of the monitoring 3334

Obtaining sensed information regarding mechanical forces applied on one or more first components of the vehicle, wherein the sensed information is indicative of at least (a) first directions of the forces, and (b) at least other parameter related to the forces. 210

Estimating, by a vehicle computer, the aggregate damage caused by the mechanical forces to one or more second components of the vehicle, per each of a plurality of second directions 220

Generating a representation of the aggregate vehicle damage each of the plurality of second directions per location 230

Determining the status of the one or more components, based at least on the component behavioral information, the status of the component. 140

Comparing the component behavioral information to another component behavior information. 142

Performing, by a vehicle, one or more driving sessions. A radius of a vehicle tire is known. 3220

Generating vehicle sensed information that reflects signals sensed by vehicle sensors (of the vehicle) during parts of the one or more driving sessions in which a tire radius affecting parameter other than vehicle weight and vehicle speed are fixed. The vehicle sensed information reflects, at least, rotational speeds of multiple vehicle wheels 3233

Determining vehicle speed during the parts of the one or more driving sessions. 3212

Receiving or determining a distance passed by the vehicle during the one or more driving sessions 3240

Determining a vehicle weight – effective radius relationship based on the distance, the vehicle sensed information and the vehicle speed – effective radius relationship. 3253

Obtaining during a learning period and by vehicle sensors, vehicle sensor measurements regarding driving sessions of the vehicle. 310

Calculating, based on the vehicle sensor measurements, an evaluated weight of the vehicle. 320

300

ESTIMATING AN EFFECTIVE RADIUS OF A TIRE OF A VEHICLE

CROSS REFERENCE

This application is a continuation in part of PCT patent application PCT/IB21/51794 filing date 4 Mar. 2021 which in turn claims priority from US provisional patent filing date Mar. 6, 2020 Ser. No. 62/985,894 and claims priority from US provisional patent filing date Mar. 6, 2020 Ser. No. 62/985,899—all applications being incorporated herein in their entirety.

This application also claims priority from U.S. provisional patent Ser. No. 63/260,907 filing date Sep. 3, 2021 that is being incorporated herein in its entirety.

BACKGROUND

Vehicles are highly complex that include multiple components. The health of the components may degrade over time and in many cases—they may fail before being fixed in dedicated garages. Some failures cannot be fixed—and may require replacing the entire components—or even bigger parts of the vehicle.

There is a growing need to provide extensive information about the status of the vehicle.

A vehicle usually has a certain number of sensors. These sensors may provide only partial information about the status and behaviors of the vehicle.

There is a growing need to provide additional information about the vehicle—and especially regarding to various components of the vehicles—and especially to aspects that are not directly measured by dedicated actual sensors.

DESCRIPTION OF THE DRAWINGS

The embodiments of the disclosure will be understood and appreciated more fully from the following detailed description, taken in conjunction with the drawings in which:

FIG. 2B is an example of a method;
FIG. 2C is an example of a method;
FIG. 3F is an example of a method.

DETAILED DESCRIPTION OF THE DRAWINGS

Figure 1:
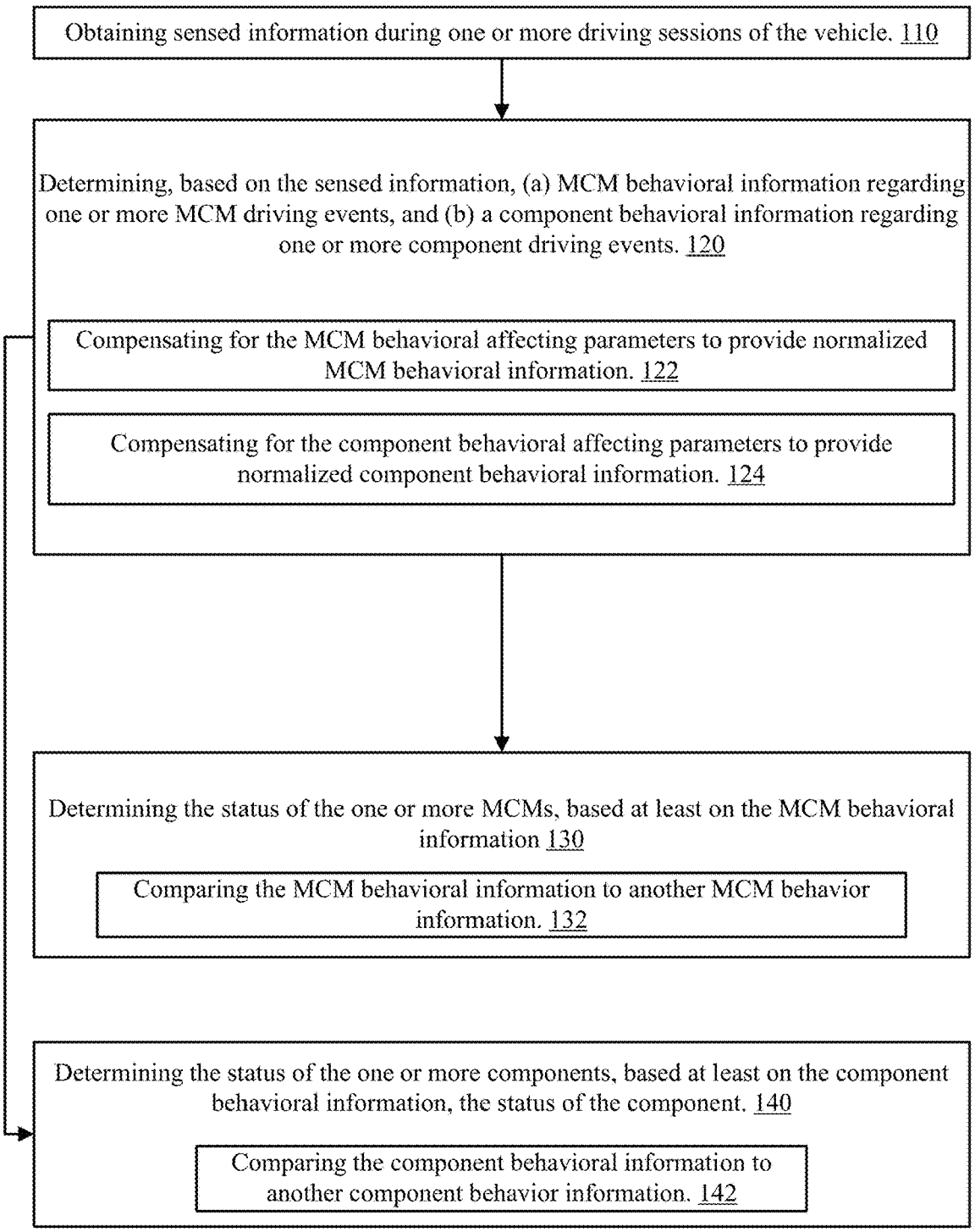
FIG. 1 is an example of a method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Any reference in the specification to a system should be applied mutatis mutandis to a method that can be executed by the system.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that can be executed by the system and should be applied mutatis mutandis to a non-transitory computer readable medium that stores instructions that once executed by a computer result in the execution of the method.

Any of the mentioned below methods, devices and/or computer readable medium may use one or more aspects and/or components and/or steps and/or instructions illustrated in at least one of the following applications—all being incorporated herein in its entirety:
a. US provisional patent 62/573,828 filing date Oct. 18, 2017.
b. US provisional patent 62/556,447 filing date Sep. 10, 2017.
c. US provisional patent 62/556,445 filing date Sep. 10, 2017.
d. US provisional patent 62/564,270 filing date Sep. 28, 2017.
e. US provisional patent 62/575,544 filing date Oct. 23, 2017.
f. US provisional patent 62/556,444 filing date Sep. 10, 2017.
g. US provisional patent 62/556,443 filing date Sep. 10, 2017.
h. US provisional patent 62/722,210 filing date Aug. 24, 2018.
i. PCT patent application PCT/IB2018/056844 filing date Sep. 7, 2019.

VCV and Aggregate Damage

The following terms and/or phrases are used in the specification:
a. And/or—additionally or alternatively. "A and/or B" may mean only A, may mean only B, and may mean A and B.
b. Multi Component Module (MCM)—a set of components that implements one of the vehicle's systems (e.g. suspension, braking, etc.).
c. MCM behavioral affecting parameters—a parameter that affects the behavior of the MCM. The parameter may be a parameter of the entire vehicle (for example weight, speed), a parameter of a components that does not belong to the MCM (for example an effective radius of a tire), and/or one or more environmental parameter (for example a temperature). The MCM behavioral affecting parameter differs from the health or status of the MCM.

d. Component behavioral affecting parameters—a parameter that affects the behavior of the component. The parameter may be a parameter of the entire vehicle (for example weight, speed), a parameter of a components that does not belong to the component (for example an effective radius of a tire), and/or one or more environmental parameter (for example a temperature). The component behavioral affecting parameter differs from the health or status of the component.

e. Comparable Vehicle Class (CVC)—vehicles of the CVC are comparable to each other—for example of the same year and model and manufacturer—have the same engine (when engine is compared), and the like.

f. Vehicle CV (VCV) is a record of information describing current vehicle status and its history, regarding vehicle multi-components-modules (MCMs) health and performance. The information is objective per a specific vehicle, as well as relative, compering to similar make and model.

g. A MCM driving event—a driving event that may be selected in order to provide information regarding a status of an MCM. For example—assuming that the MCM is the chassis of the vehicle then the driving event may include driving over a bump or entering a pothole—as the MCM is expected to affect the movement of the vehicle while passing the bump and/or while entering a pothole.

h. A component driving event—a driving event that may be selected in order to provide information regarding a status of a component. For example—assuming that the component is one or more bushings, then the component event may include turning the vehicle—as a defective bushing is expected to introduce random movement of the wheels in relation to the steering wheels.

There may be provided a method for evaluating the status of various units of the vehicle. The evaluation may be component-based or may be multi-component-module (MCM)-based. In an MCM the status of the whole MCM may be provided and/or the status of the separate components of the MCM may be provided.

For example—a suspension may be an MCM—and its status as a whole may be provided. Additionally or alternatively—the status of the suspension components may be provided—for example, the status of an air spring, dumper, bushes and the like.

The status of a component and/or of an MCM may be evaluated by obtaining sensed information during one or more driving sessions of a vehicle and processing the information. The processing may be executed by the vehicle, and/or may be executed at least in part by another computerized system located outside the vehicle.

The processing may include compensating for the impact of behavior affecting parameters on the behavior of vehicle components and/or vehicle MCMs. The impact may be learnt by obtaining and processing large amount of information (for example using big data technologies), machine learning and the like. Examples of obtaining and processing large amount of information are illustrated in PCT patent application PCT/IB2018/056844.

By learning the impact of driving events on the lifespan and/or state of the components and/or MCMs—the method may predict future faults and provide an indication of fault prevention steps to be taken—even well before the failure occurs.

The method may provide a wealth of information of the status of the vehicle, of multiple components of the vehicle and or one or more MCMs—of the vehicles.

The status of components and/or MCMs may be arranged in various manners—for example may be gathered in so-called Vehicle Curriculum Vitae (VCV)—information suite describing vehicle history and current status, regarding health and its characteristics and performance of its different MCMs. Any other arrangement of information may be provided.

When sensed information is gathered from different sensors—it may be correlated in the sense that sensed information obtained by one sensor at a certain point of time will be processed with (and/or compared to and/or used to validate) sensed information obtained by another sensor at the certain point of time. The correlation may result in associating sensed information sensed by different sensors but related to the same event.

The VCV may be aimed to provide the vehicle owner, the vehicle manufacturer, service provides, and the like, meaningful insights about the health and performance of a specific vehicle, for better:
a. Condition evaluation.
b. Diagnostics for maintenance.
c. Improvements for future model.

The MCMs may include at least one of the following:
a. Suspension.
b. Camber, Toe and Caster.
c. Engine.
d. Chassis.
e. Vehicle body.
f. Tires.
g. Brakes.
h. Steering system.
i. Battery.
j. Gear/transmission.

Following are the detailed aspects for characterizing the MCMs. For each of them, analyze their performance correlated with:
a. Surface information: for example grade, inclination, curvature, roughness, friction, distresses as stimulations. Examples of surface information are illustrated in PCT patent application PCT/IB2018/056844 filing date Mar. 14, 2019 which is incorporated herein by reference.
b. Other vehicle sensors. The other sensors may be physical (also referred to as actual) sensors and/or virtual sensors.
c. Sensed information from other vehicles.

Each MCM may be analyzed as a whole unit and the method may proceed to analyze components of the MCM.

Suspension

A suspension should maximize the friction between the tires and the road surface, to provide steering stability with good handling, and to ensure the comfort of the passengers.

The method may analyze the suspension as an MCM.

The method may assess performance and health of the different suspension MCM components:
a. Air spring.
b. Dumper.
c. Links.
d. Bushing.
e. Anti-Roll Bar.
f. Metal spring.

The method may include analyzing general performance of the suspensions as a whole system, and may correlate this with a stimulation (driving event that will result in a response of the suspension).

Any of the following items (signature) may be normalized, may be compared to other signatures, and may be further processed to provide one or more scores. For simplicity of explanation some of these steps may be omitted.

Impulse response—this tests the "Ride" aspect—ability to dump/restrain impulse type of excitations.

The MCM driving events (also referred to as trigger or excitation) may include:
 a. Step-up impulse: climb out of a pothole, or climb on top of a bump.
 b. Step-down impulse: drop into a pothole, or drop from a bump.

The method may include characterizing the impulse-excitation—magnitude and nature.

The method may include normalization that should take into account (for example) MCM behavioral affecting parameters such as wheel speed, weight of the vehicle, torque (higher torque will reduce the effect of the step-up impulse), acceleration, grade of the road etc.

The method may measure the resulted effect on the chassis/driver movements:
 a. Use accelerometer attached to chassis—2D or 3D.
 b. Wheel speed.
 c. Measure "Bump steer" effect.

The method may characterize the impulse response to generate a signature.

This may include time to frequency conversion (such as Fast Fourier Transform), calculating response features, and generating a signature such as an impulse-response-signature, describing: impulse-excitation, response, bounce, etc. The signature should represents the impulse response—for example amplitude of speed change, duration of speed oscillations, and the like.

The signature may be compared to signatures of older responses of the same vehicle and/or compared to signatures of responses of other vehicles in the same CVC.

The method may include calculating at least one out of:
 a. Suspension Step-up response score—per velocity.
 b. Suspension Step-down Response score.

Any of these scores may be based on x-axis and z-axis acceleration signals (Ax and Az) during a period (for example, a few seconds for example ten seconds) following the impulse excitation. These acceleration signals may be processed to determine the average value of the dumping factor and the peak-to peak (amplitude) of the response.

The score may be the signature or may apply any function on the signature.

The score may represent the normalized impulse response in any manner.

Serpentine Response.

The MCM driving event may include fast mass transfer from side to side. It may be detected by sensing sharp steering to one side followed immediately by sharp steering to the other side. Sharp—above a predefined threshold—for example more than X degrees per second.

The method may include characterizing the serpentine-excitation by magnitude and nature.

Normalization should take into account (for example) MCM behavioral affecting parameters such as wheel speed, torque, acceleration, road grade, etc.

The method may measure the resulted effect on the chassis/driver movements:
 a. Use accelerometer attached to chassis—2D or 3D.
 b. Wheel speed.
 c. Deflection sensors.

The method may characterize the serpentine response to generate a signature.

This may include time to frequency conversion (such as Fast Fourier Transform), calculating response features, and generating a signature such as a signature that may describe serpentine-excitation vector, response, bounce, etc.

The signature may be compared to signatures of older responses of the same vehicle and/or compared to signatures of responses of other vehicles in the same CVC.

The method may include calculating at least one out of:
 a. Right side suspension serpentine response score.
 b. Left side suspension serpentine response.
 c. As the chassis is expected to act against the tendency to lean to the outer side of the serpentine, we measure: Ay, Az, and V. Then compensate for road banking. Then calculate the vehicle banking.
 d. The score gets higher as the banking gets lower.

Continues Response and Quasi-Continues Responses.

This may include a few MCM driving events such as: Cornering, acceleration squat, breaking and driving on a rough road.

Cornering may be the amount of centrifugal force the vehicle can generate measured in g's, and expressed as Lateral Acceleration. Cornering is a measurement of the force exerted on the vehicle's center of gravity. For example measuring the angle of the vehicle to the road when driving in a curved segment of the road.

Acceleration—results in a squat motion—when accelerating the front of the vehicle is elevated and the rear of the vehicle is lowered. This may be normalized by various parameters such as (road grade, inclination) or dynamic/quasi-continues (acceleration).

Braking—results in a dive motion. When decelerating the front of the vehicle is lowered and the rear of the vehicle is lifted.

Rough road—a "frequent" set of impulse excitations.

The method may include characterizing the continues-excitation: nature and magnitude.

This may be followed by normalizing by MCM behavioral affecting parameters such as wheel speed, torque, accelerometer, grade, radius, banking, roughness index, acceleration.

The method may include measuring the resulted effect on the chassis/driver movements:
 a. Use accelerometer attached to chassis—2D or 3D.
 b. Use the different HW sensors of suspension MCM: air-spring, dumper, etc.

The method may include measuring the resulted effect on the grip:
 a. Braking—grip loss on rear wheels.
 b. Acceleration—grip loss on front wheels.
 c. Cornering right/left—grip loss on left/right wheels, over-steer/under-steer.
 d. Rough road—grip loss on all wheels, correlated to driving speed.
 e. Measure "ride height"—During the continues-excitation.

Characterize the continues-response:
 a. Calculate: chassis position, relative to surface and Earth, at the 4 corners
 b. Using: features, processed HW sensors, etc.
 c. Generate a continues-response-signature, describing: continues-excitation, response.

d. Normalize to comparable values, using: speed, weight, and continues operation duration (that heat the dumpers).

The signature may be compared to signatures of older responses of the same vehicle and/or compared to signatures of responses of other vehicles in the same CVC.

Generate performance score: continuous—excitation type.

Outcomes:
a. Suspension Cornering Response score.
b. Suspension Braking Response score.
c. Suspension Acceleration Response score.
d. Suspension Banking Response score.
e. Suspension Roughness Response score.

The score functions reflect the tendency of the vehicle chassis to remain parallel to earth, despite of the excitation forces.

Suspension Sub-Component: Air Springs

Air springs includes of a cylindrical chamber of air positioned between the wheel and the vehicle's body, use the compressive qualities of air to absorb wheel vibrations. Electrically controlled air-springs are used also to lift the vehicle or level it.

When detecting triggers/excitations/events (component driving event):
a. Hard accelerations/braking
b. Air compressor/releasing—valve activation
c. Deflection sensor changes during idle periods, or quasi-static excitations Characterize the excitation magnitude and nature.

Normalizing by compensating for component behavioral affecting parameters such as speed, acceleration/deceleration, road grade, weight etc.

Measure the resulted effect on the chassis/driver movements:
a. Use accelerometer attached to chassis—2D or 3D, deflection sensors, valve/compressor, pressure, etc.
b. Measure deflection and "quasi-static" acceleration changes Characterize the performance and response for air leak, by:
a. Aggregate the compressor "abnormal" activation period, ignoring the periods where it should work (i.e. when air spring needs control). I.e. focus on "smooth" driving sections.
b. Monitor deflection sensor changes when compressor is off, and vehicle is standing.
c. Evaluate working area/height (i.e. dynamic range of the springs).

Monitor min/max deflection values, correlated with quasi-static excitations.

Characterize the performance and response for control loop characteristics by
a. Activating compressor and releasing-valve in reaction to changes.
b. Monitor "nose dive" during hard braking.
c. Fuse deflection sensors and or acceleration Ax, Az with brake torque
d. Normalize with: road grade, weight.
e. Monitor "rear squat" during hard acceleration—the same as above.

Normalization—weight

Generate "signatures":
a. Air leak amount—per excitations/period—aggregate the air compressor working time in comparison to idle time. The ratio will be the score.
b. Working area/height—per weight, quasi-static excitation.

$F = mA = K\,deltaX$

The lower the K, the higher is the score.
c. Compressor/valve control loop—air compensation per excitation.
d. Measure the time elapsed from the excitation moment to the compressor or valve activation. The shorter the period the, the higher is the score.

The signature may be compared to signatures of older responses of the same vehicle and/or compared to signatures of responses of other vehicles in the same CVC.

Outcome scores are calculated as illustrated two paragraphs above-under generate "signatures" title.
a. Air spring system air leak score.
b. Air spring working area score.
c. Air spring control performance on excitations score.

Suspension Sub-Component—Damper

Springs are great at absorbing energy, but not so good at dissipating it. Damper controls unwanted spring motion. Typically, damper have more resistance during its extension cycle than its compression cycle—so when driving over a bump, the spring will absorb the shock fast, but will regain its size slower.

Damper and air spring are velocity-sensitive—the faster the suspension moves, the more resistance the shock absorber provides. This enables shocks to adjust to road conditions including bounce, sway, brake dive and acceleration squat.

The component driving events are impulse stimulation (step-up/step-down)

Given (normalizing factors) component behavioral affecting parameters: impulse "energy"/magnitude and type, Road grade, Weight, and Tire pressure Characterize damper response, measure and calculate the following:
a. Restrain factor.
b. Velocity response—per impulse magnitude.
c. Differentiate between Compression cycle Vs. extension cycle.
d. Use Deflection height Vs. Z-Acceleration, during compression and extension cycles.
e. Generate signatures—combined vector, Per the above response components.

Normalize.

Generate scores per the above performance components.

The damper may be monitored using at least some of the following sensors: body acceleration (Longitudinal, Lateral, Yaw), wheel vertical acceleration: vertical accelerometer attached to wheel axle, vertical accelerometer on each corner of the body, deflections sensor, wheel speed sensor, solenoid current [A] for activating one or more valves per each dumper, air spring pressure sensor (central reservoir for all 4 corners), air valve actuator (Boolean)×4 corners, compressor on/off sensor (Boolean), sensor of a multi-chamber air-spring: valve between the chambers—On/off (Boolean)—controls the air-spring stiffness coefficient The method may include monitoring air-spring stiffness (as illustrated twelve paragraphs above-under generate "signatures" title), and correlating with the multi-chamber valve—expect different stiffness value per different valve opening configuration.

Sub-Component: Bushing

Bushings are cushions made of rubber, polyurethane or other materials. They're mounted on vehicle suspension and steering joints to absorb road bumps, control the amount of movement in the joints and reduce noise and vibration.

Bushes gets defected when rubber is warn-out or dried.

Following symptoms indicate faulty bushes:

First component driving event—may be aimed to find whether the vehicle wanders during cruise. The vehicle "tracts" to one side without steering wheel input. Each time to a different direction and angle.

How to detect the first component driving event: monitor vehicle course diversion by detecting difference in left/right wheel speeds, that is not related/correlated to steering position. Defective bushing may allow random movement of the wheels in relation to the driving wheel. Defective bushing may result in bias towards one side of the vehicle—and in this case there is a need to check whether there is a difference between effective radius of wheels of a pair of wheels (pair of front wheels or pair of rear wheels).

The method may generate a virtual sensor by generating a mapping such as a look up table (LUT) of wheel-speed difference versus steering wheel position: magnitude and tolerance, at high resolution.

The method may analyze this mapping by looking for variations that implies "random" wandering and score the phenomena magnitude.

The method may generate a first score.

Second component driving event—hitting a bump or a pothole—for detecting the steering wheel movements when hitting bump of pothole. When hitting a same impulse (step-up/step-down) on both sides. This may be detected by monitoring a change in the steering position at the moment, and vehicle heading right after the impact.

This may be detected by:
a. Differentiating between driver deliberate movement of the steering wheel, and the undesired movement (that the method may look for): check for sharp/high frequency micro movements (assuming that can't be done by the driver)
b. Monitoring the undeliberate change of vehicle heading, as a result of hitting a pothole/bump, monitor the lateral acceleration right after a pothole or bump, correlate it with steering wheel change.

The method may generate a virtual sensor output that may be a mapping (for example a LUT) of the above correlations.

The method may calculate a second score.

A third component driving event—may be aimed for detecting steering wheel backlash/hysteresis. This may involve having the vehicle diverting from its course, uncorrelated with its steering wheel position, or micro movement (for example −2 degrees or less) of steering wheel are not correlated with vehicle actual course diversion.

This may be detected. When slight diversion is detected: monitor difference between speeds of left and right wheels, correlate it with steering wheel position changes. When steering wheel movement direction is changed (e.g. from Clockwise to Counter clock wise CW), and the change is very small, then monitor the first moments after the change of direction: same as above—monitor difference between speeds of left and right wheels, correlate it with steering wheel position change.

The method may generate a virtual sensor output that may be a mapping (for example a LUT) of the above correlations.

The fourth component driving event may be aimed to detect vibrating wheels.

When wheels are vibrating "randomly"—i.e. not correlated with speed or wheel frequency—therefore not related to wheel unbalance—this may be a result of a defective bushing.

The frequency content of the vibration is high—i.e. "sharp" micro movements. The phenomena may get worse as road micro-texture is rough.

The phenomena may be detected by analyzing the wheel speed, look at the high-frequency components. In case vibrations are transferred to sprung mass: detect it using Accelerometer. Eliminate the noise correlated with wheel frequency. Normalize with rough roughness (an example of a component behavioral affecting parameter).

The method may provide a virtual sensor output that may correlate random wheel vibrations with surface roughness—per wheel and/or per axes.

The method may generate a fourth score based on the correlation.

The method may differentiate between a "self-moving" steering wheel (due to bad bushes) and driver move of the steering wheel. This may include detecting load on the steering wheel motor (like used for lane-keeping mode).

Camber, Toe and Caster

This triples indicates of the position (rather orientation angle) of various driving axes.

This may use a virtual sensor that provides an indication of a component behavioral affecting parameter such as a tire effective Radius.

The method may senses or receive an indication of whether the driver is holding the steering wheel, and what is his applied force/load.

The method may generate a signature of each phenomena (out of caster, toe and cumber).

The signature may be compared to signatures of older responses of the same vehicle and/or compared to signatures of responses of other vehicles in the same CVC.

Caster—the caster angle is responsible for the tendency of the steering wheel to straighten when releasing its hold right after cornering.

Change in Caster is considered as damage to chassis, and difficult to fix/compensate. Therefore very important to monitor and score.

The component driving event is aimed to detect that a steering wheel position returns slowly or doesn't return to neutral position when released after cornering.

The component driving event may include detecting a steer of the vehicle that is followed by a release of the steering wheel.

In case of a fault—the vehicle does not return fast enough to straight driving course.

This can be detected by monitoring, when steering wheel is released right after steering is done, the time/distance it take for the vehicle to return to straight driving course.

The monitoring result may be normalized by component behavioral affecting parameters such as wheel speed, weight, tire pressure, road grade.

The method may include detecting the release of drive wheel by sensing pressure applied on the drive wheel.

The method may provide a virtual sensor output that may correlate the return distance to neutral per speed.

The method may generate a score based on the correlation. The faster the steering wheel get to its origin position, normalized by driving speed, the higher the score is.

Toe angle is responsible for stabilizing the vehicle steering: when driving straight and releasing the string wheel, it effects stability of the steering, when the driver is not holding the steering wheel. Unlike Camber, the Toe angle faults can be fixed by garage. Therefore needs to be monitors and presented to service personal as input information.

The component driving event is aimed to detect that a steering wheel position returns slowly or doesn't return to neutral position when released after cornering.

In case of a fault the steering wheel feels "light", i.e. not stable, or the driver applies micro steering "corrections" while cursing at straight course, or the driver does not apply steering force on the steering wheel, the vehicle is drifting to one side, or course is corrected "too many times" from side to side.

The method may detect this by monitoring, when driving straight at cruise, and driver is not applying steering force, a diversion—difference of left and right wheel speeds.

The method may rule out difference in left/right tire pressure/effective diameter/rolling resistance/grip.

The method may rule out bushes problem—verify a consistency in the diversion (direction and magnitude) along time—the vehicle will always "pull" to same direction with same diversion magnitude.

The monitoring result may be normalized by component behavioral affecting parameters such as speed and surface roughness.

The method may provide a virtual sensor output that may correlate diversion/direction instability per speed.

The method may generate a score based on the correlation.

The component driving event is aimed to detect that the vehicle slips during curving, as the wheel is not heading the bearing (AKA slip angle).

While cornering, the steering wheel position is not exactly correlated with the cornering radius, even when lateral excitation is low, and surface friction is high, and due to miss-alignment of the Ackerman angle (faulty Toe).

The method may detect this during cornering and relatively steady state having radius and speed, with relatively small lateral excitation magnitude. The method may measure wheel speeds, and extract the difference between left and right, estimate cornering radius, and correlate with steering wheel position.

The method may provide a virtual sensor output that may correlate the wheel speed differences (left/right/rear/forward) Vs. steering wheel position.

The method may generate a score based on the correlation. The bigger the difference between left/right difference and between the steering wheel position, the lower is the score.

A component driving event may be aimed to detect that a driver needs to apply micro steering wheel movements even when driving straight (for compensating forma faulty toe)—or to detect that while driving straight forward, the wheels steering is not stable—that may require the driver to apply micro corrections.

The method may monitor steering wheel movements when driving straight for some period, may aggregate movements (integrate delta steering wheel positions) and average per period.

The method may provide a virtual sensor that outputs a value representing the instability—average required movements to keep straight driving.

Camber—camber angle mainly effects the vehicle grip while cornering. A defect Camber angle is considered as "chassis damage" that is difficult to fix, and thus very important to monitor and score.

The component driving event may be aimed to detect a loss of lateral grip during sharp cornering. While sharply cornering, the vehicle slips laterally.

The method may detect this by detecting lateral slips/skids when cornering sharply.

The detected information may be normalized by component behavioral affecting parameters such as lateral acceleration, surface friction, vehicle weight, tire pressure, surface banking/grade.

The method may differentiate between left/right cornering to detect a specific side problem.

The method may provide a virtual sensor output that may correlate the correlating: lateral slip Vs. the above normalization detected information.

The method may generate a score based on the correlation. The higher the difference between grip while cornering left and right, the lower the score is.

FIG. 1A illustrates a method 100.

Method 100 is for evaluating a status of a vehicle.

Method 100 may start by step 110 of obtaining sensed information during one or more driving sessions of the vehicle.

A driving session may last between a few seconds, a few minutes, to one or more days, and even more.

The obtaining may include sensing sensed information by one of more actual sensors of the vehicle. The obtaining may also processing sensed information from one or more sensors (and maybe additional information) to provide sensed information of one or more virtual sensors.

The vehicle may include multiple components and some may be included in MCMs.

It is assumed, for simplicity of explanation, the method 100 evaluates the status of the vehicle by determining the status of one or more MCMs and the status of one or more components.

The status may be represented by one or more scores, by one or more mappings and/or look up tables, and the like.

A component (of the one or more components) may belong to an MCM (of the one or more MCMs). Alternatively—a component (of the one or more components) may not belong to any of the one or more MCMs.

Step 110 may be followed by step 120.

Step 120 may include determining, based on the sensed information, (a) MCM behavioral information regarding one or more MCM driving events, and (b) a component behavioral information regarding one or more component driving events.

A MCM driving event is selected in order to provide information regarding a status of an MCM. For example—assuming that the MCM is the chassis of the vehicle then the driving event may include driving over a bump or entering a pothole—as the MCM is expected to affect the movement of the vehicle while passing the bump and/or while entering a pothole.

A component driving event is selected in order to provide information regarding a status of a component. For example—assuming that the component is one or more bushings, then the component event may include turning the vehicle—as a defective bushing is expected to introduce random movement of the wheels in relation to the steering wheels.

A behavior of at least one first part of the vehicle during the one or more MCM driving events may be indicative of a status of one or more MCMs. For example—assuming that the MCM is chassis and the chassis is defective—then the defective chassis may affect the progress of the entire vehicle and/or the wheels of the vehicle.

A behavior of at least one second part of the vehicle during the one or more component driving event may be indicative of a status of one or more components. For example—assuming that the component is one or more bushings—and that one or more bushings are defective— then the one or more bushings may affect the progress of the entire vehicle and/or the wheels of the vehicle.

Step 120 may be followed by step 130 and/or by step 140.

Step 130 may include determining the status of the one or more MCMs, based at least on the MCM behavioral information.

Step 130 may include step 132 of comparing the MCM behavioral information to another MCM behavior information.

The other MCM behavior information may be an older MCM behavioral information (of the same MCM of the same vehicle) regarding a previous MCM driving event—for example driving over the same bump, driving over a similar bump, and the like.

The other MCM behavior information may be MCM behavior information of an MCM (same MCM) of another vehicle. The vehicle of the MCM and the other vehicle may belong to the same Comparable Vehicle Class.

Step 140 may include determining the status of the one or more components, based at least on the component behavioral information, the status of the component.

Step 140 may include step 142 of comparing the component behavioral information to another component behavior information.

The other component behavior information may be an older component behavioral information (of the same component of the same vehicle) regarding a previous component driving event—for example driving over the same bump, driving over a similar bump, and the like.

The other component behavior information may be component behavior information of a component (same component) of another vehicle. The vehicle of the component and the other vehicle may belong to the same Comparable Vehicle Class.

The sensed information may be indicative of MCM behavioral affecting parameters and wherein the method may include compensating for the MCM behavioral affecting parameters to provide normalized MCM behavioral information.

The compensation may be executed during step 120, 130, during 140 and/or during an addition step (now shown). For simplicity of explanation, the compensation is illustrated as being a part (122) of step 120.

The sensed information may be indicative of component behavioral affecting parameters and wherein the method may include compensating for the component behavioral affecting parameters to provide normalized component behavioral information. The compensation may be executed during step 120, 130, during 140 and/or during an addition step (now shown). For simplicity of explanation, the compensation is illustrated as being a part (124) of step 120.

The MCM behavioral affecting parameters may be identified by applying machine learning on a vast amount of information acquired by multiple vehicles.

The MCM may be a chassis of a vehicle and the MCM driving events may include at least two of driving on a step, driving in a pothole, serpentine driving, cornering, acceleration squat, breaking, and driving over a rough road.

The MCM may be a chassis of a vehicle, and the MCM behavioral information may represent an impulse response of the vehicle per vehicle speed for a step-up event and for a step-down event.

The MCM may be a chassis of a vehicle, and the MCM behavioral information may represent at least one of:
 a. a loss of grip of one or more rear wheels during a breaking event;
 b. a loss of grip of one or more front wheels during a vehicle acceleration event;
 c. at least one response to a cornering event, the response may be selected out of (a) a grip loss of wheels of one side of the vehicle, (b) over-steering and (c) under-steering; and
 d. grip loss per vehicle speed during a driving on a rough road.

The MCM may be a chassis of the vehicle and the determining of the status of the one or more MCMs may include calculating multiple scores, the multiple scores may include at least one suspension cornering response score, a suspension braking response score; a suspension acceleration response score; a suspension banking response score; a suspension roughness response score, a suspension serpentine response score; a suspension step-up response score; and a suspension step-down response score.

The MCM may be a chassis of a vehicle and the one or more component may be selected out of an air spring, a damper, one or more bushes, and one or more steering axes.

The one or more component may be an air spring and the determining of the status of the one or more component may include calculating an air spring system air leak score, an air spring working area score, and an air spring control performance on excitations score.

The one or more component may be a damper and the determining of the status of the one or more component may include calculating a restrain factor, a velocity response per impulse magnitude, and a compression cycle versus extension cycle score.

The one or more components may be one or more bushes, and the determining of the status of the one or more component may include calculating a wheel speed difference versus steering wheel position score, a steering wheel movements when hitting bump or a pothole score, a steering wheel backlash or hysteresis score, and a high frequency wheel vibrations score.

The one or more components may be one or more steering axes, and the component behavioral information may include one or more steering axes angles, the one or more steering axes angles may include camber, tow, and castor.

The sensed information may include information about a force applied on a steering wheel of the vehicle. This sensor may provide an indication of when the driver releases the wheel.

The sensed information may be gained by at least one virtual sensor and at least one actual sensor of a vehicle.

The MCM may be a chassis of the vehicle and the method may include estimating an aggregated damage to the chassis from multiple directions.

The estimating may be based on sensed information acquired during a lifespan (or any other period) of the vehicle.

Health of engine

Engine (combustion) or motor (electric) will be monitored mainly as MCMs:

Using energy equation, analyze the different coefficients/components of the equation.

Monitoring and aggregating impacts related to engine/motor performance—implying cumulating damage.

Logging of significant events

Following characteristics are analyzed, monitored and scored:

Energy Efficiency

Monitor the engine efficiency along time, per different vehicle configurations: gear, RPM, load, etc.

Energy equation: efficiency components along time

Symptoms—Engine inefficiency per configuration

Losses due to: rolling resistance, wind drag, engine general health.

Using: Momentary fuel consumption rate (combustion)/current consumption (electric), CoG speed, Road grade, Gear position, Engine RPM, Torque transfer state, Tire pressure, Weight estimation or at least indication of change (e.g. door open)

How to detect it:
a. Detect segments of quasi-steady state driving. When all the following are within some marginal changes: gear, road grade, torque transfer state.
b. Segment duration is 2~5 [Sec].
c. For each state, generate an instance of the energy equation.
d. Solve the set of equations—per same-weight sessions. Extract the different coefficients:
  1. LUT: inefficiency per gear and RPM
  2. Rolling resistance coefficient.
e. Virtual sensor output:
f. LUT and coefficients
  i. Score the LUT.
  ii. Detect degradations for the specific vehicle, or in comparison to CVC.
g. Remarks: Some of the coefficients, or their initial value, will be generated during pre-production process, per CVC. Then, will be saved on board. Engine efficiency LUT may imply the potential power that can be extracted.
h. If the estimation of the wind drag component fails, using a default—such as the energy equation at low speeds (i.e. <100 [kph])

Accumulated damage

The method may define the situations/configurations where the engine is worn-out most. Then, accumulate periods times situation-magnitude when such situations occur. Accordingly, score the estimated accumulated damage.

Influencing conditions: Engine load, Engine temperature, and Engine RPM—accumulated The situations:
a. High engine RPM, at too low engine temperature and high load. Score gets worse at: high RPM, low temperature, high load.
b. Low engine RPM, at high gear, and high load, close to the point where auto gear-box is about to switch gear down (engine "ringing" point). Score gets worse at RPM goes low, and load goes high.

Virtual sensor output:
a. Aggregation numbers/counters (similar concept to "Odometer counter").
b. Correlated scores.

Logged Events

Log the situations where extreme conditions happened: Very high RPM during a long period. Very high RPM at very low engine temperature. Very high engine temperature during long period.

Chassis and Body System

The chassis frame will be monitored mainly as MCMs—Monitoring and aggregating impacts related to chassis completeness and status—implying cumulated damage, Logging of significant events.

Accumulated Damage

Influencing conditions:
a. Impacts—wheels collision at bumps/potholes/sidewalks.
b. Impacts—body collisions.

Aggregate:
a. Abrupt wheel speed changes—score/weight each event with: speed, wheel-speed change—aggregate per wheel.
b. Hard acceleration as detected during collision—aggregate per direction of hit.

Virtual sensor output:
a. Per wheel impact damage score
b. Per body side impact damage score Logged Events For each significant collision event as described above, save a record.

Tires

Tires main target is to provide a grip and smooth driving experience.

The tires characterization is done with the following tire parameters: Stiffness, Tread depth, Aquaplaning handling, and Vibrations.

Brakes

Braking system will be monitored as MCM.

Phenomena: un-even brake disc

Symptom—while braking, the wheels are vibrating due to a-symmetric brake discs.

How to detect it—while braking, monitor micro changes in wheel speed, correlated with wheel frequency.
a. Per wheel.
b. Rule out rough road conditions.
c. Correlate with braking pressure.
d. Virtual sensor output:
  i. Generate a score of braking distance, normalized with brake pressure.
  ii. Monitor changes in this value.

Phenomena: increasing braking distance

Symptom: While braking, the wheels are vibrating due to a-symmetric brake discs

How to detect it—while braking, monitor micro changes in wheel speed, correlated with wheel frequency.
a. Per wheel.
b. Rule out rough road conditions.
c. Correlate with braking pressure.

Virtual sensor output:
a. Generate a score of noise/vibration per wheel, normalized with brake pressure.
b. Monitor changes in this value.

Ability to brake—per surface friction, weight, road grade, requested brake torque.

Steering

Basically, this MCM performance monitor is done as part of the suspension MCM monitoring.

Logged Events—for each significant collision event as described above, save a record.

What is regarded as significant, high, low, long, short, and how the damage should accumulate may be learnt over time, during tests, based on information provided by vehicle vendor, vehicle manufacturer, garages, and the like.

There may be provided a method for learning how high stress of the engine time segments are applied to accumulated damage.

The method may include collect data of engine malfunction and the history of the engine before malfunction.

Collect data from engines that are functioning and estimate their performance by tracking their fuel consumption, temperature, generated torque and so on.

Learn a state of motor indicating probability of malfunction and performance.

Collect data for an engine that is outside of the training set use the model learned to give its state.

Figure 2A:
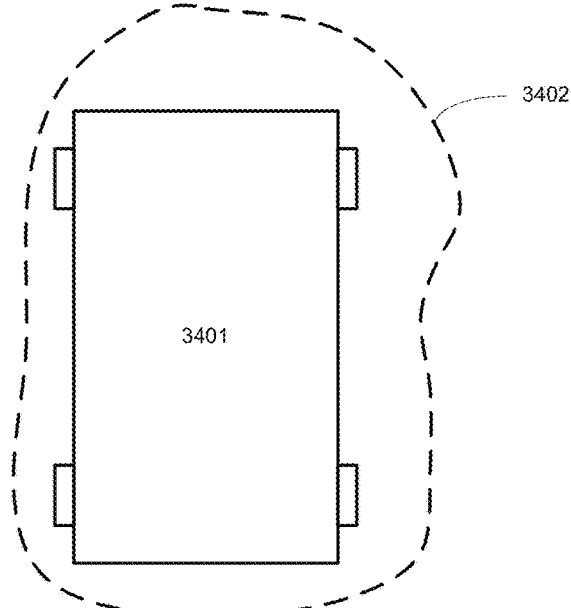
FIG. 2A is an example of a method.

FIG. 2A illustrates steps 3312 and 3314 of method 3310 and also illustrates a graphic representation of an image of a vehicle 3401 surrounded by a curve 3402 that illustrates the damage related to the chassis from each direction. The curve may be replaced by a table or a list of aggregate damage per direction bin.

FIG. 2B illustrates method 3330.

Method 3330 starts by step 3332 of monitoring during duration of life of vehicle events that reduce the lifespan of the motor.

Step 3332 is followed by step 3334.

Method 2C illustrates method 200 for evaluating a status of a vehicle.

Method 200 may start by step 210 of obtaining sensed information regarding mechanical forces applied on one or more first components of the vehicle, wherein the sensed information is indicative of at least (a) first directions of the forces, and (b) at least other parameter related to the forces.

Step 210 may be followed by step 220 of estimating, by a vehicle computer, the aggregate damage caused by the mechanical forces to one or more second components of the vehicle, per each of a plurality of second directions.

Step 220 may be followed by step 230 of generating a representation of the aggregate vehicle damage each of the plurality of second directions per location.

Step 210 may include obtaining the sensed information from at least one actual sensor and at least one virtual sensor.

The one or more second components may include a chassis of the vehicle.

The one or more second components may include a body of the vehicle.

The one or more first components may include vehicle wheels.

The sensed information may include acceleration information.

Determining a Current and Nominal Radius of a Tire.

An ideal tire has a perfect symmetrical shape. An actual tire has a shape that is not perfectly symmetrical—for example—some parts of the tire may be deformed.

It should be noted that, tire deformation is not the common reason for tire asymmetry. The common reason is the existence of the contact patch which is strait and not round and the expansion and contraction of the tire that naturally happens while driving.

Given an actual tire—the actual tire may be modeled by an ideal tire that has an effective radius so that the actual tire circumference of the actual tire equals the tire circumference of the ideal tire.

A current effective radius of the tire represents the tire effective radius under tire radius affecting parameters conditions (such as tire air pressure, vehicle weight, wheel speed and wheel temperature) that exist during one or more driving sessions.

A nominal radius of the tire represents the effective radius under predefined values of wheel radius affecting parameters condition.

A nominal radius may also be referred to astatic loaded radius (aka nominal radius) that is the loaded radius of a stationary tire inflated to the normal recommended pressure.

The actual radius may also be referred to as effective rolling radius (and/or effective tire radius), Re, is the ratio of the linear velocity of the wheel center in the XSAE direction to the angular velocity of the wheel.

The nominal effective radius may change slowly over time—as the depth of the tire threads decrease over time. Thus—the nominal effective radius may provide an indication of the depth of the tire threads.

There is a growing need to know at least one out of current effective radius of the tire and the nominal effective radius of the tire.

FIG. 3A-3F illustrates various methods for determining effective radiuses of tires.

Figure 3A:
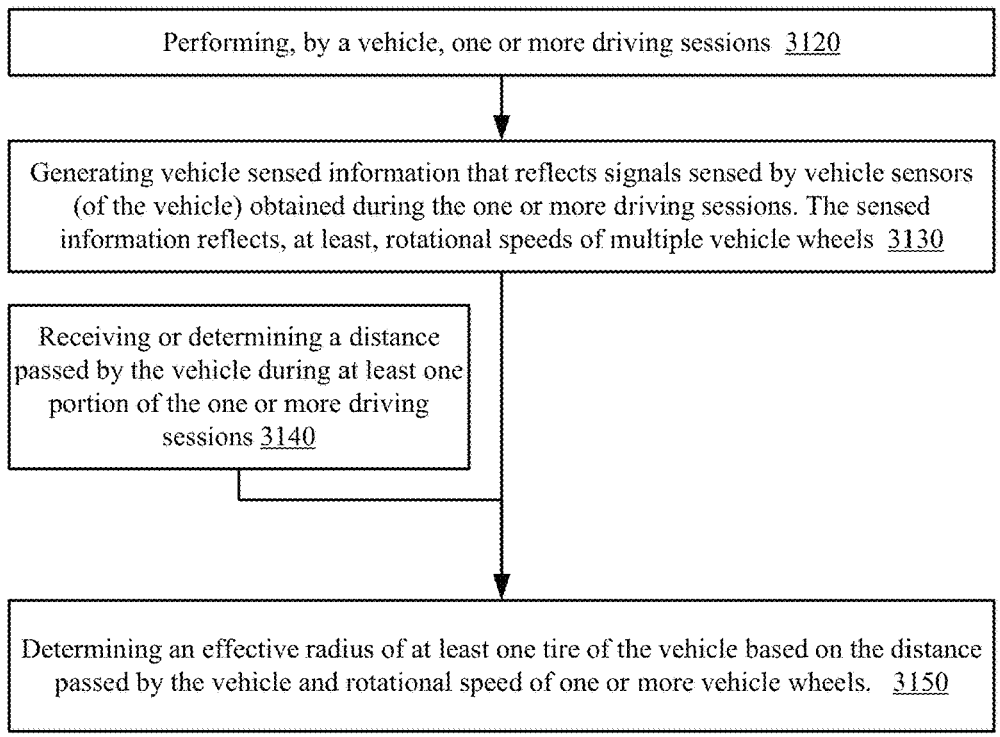
FIG. 3A is an example of a method.
Figure 3B:
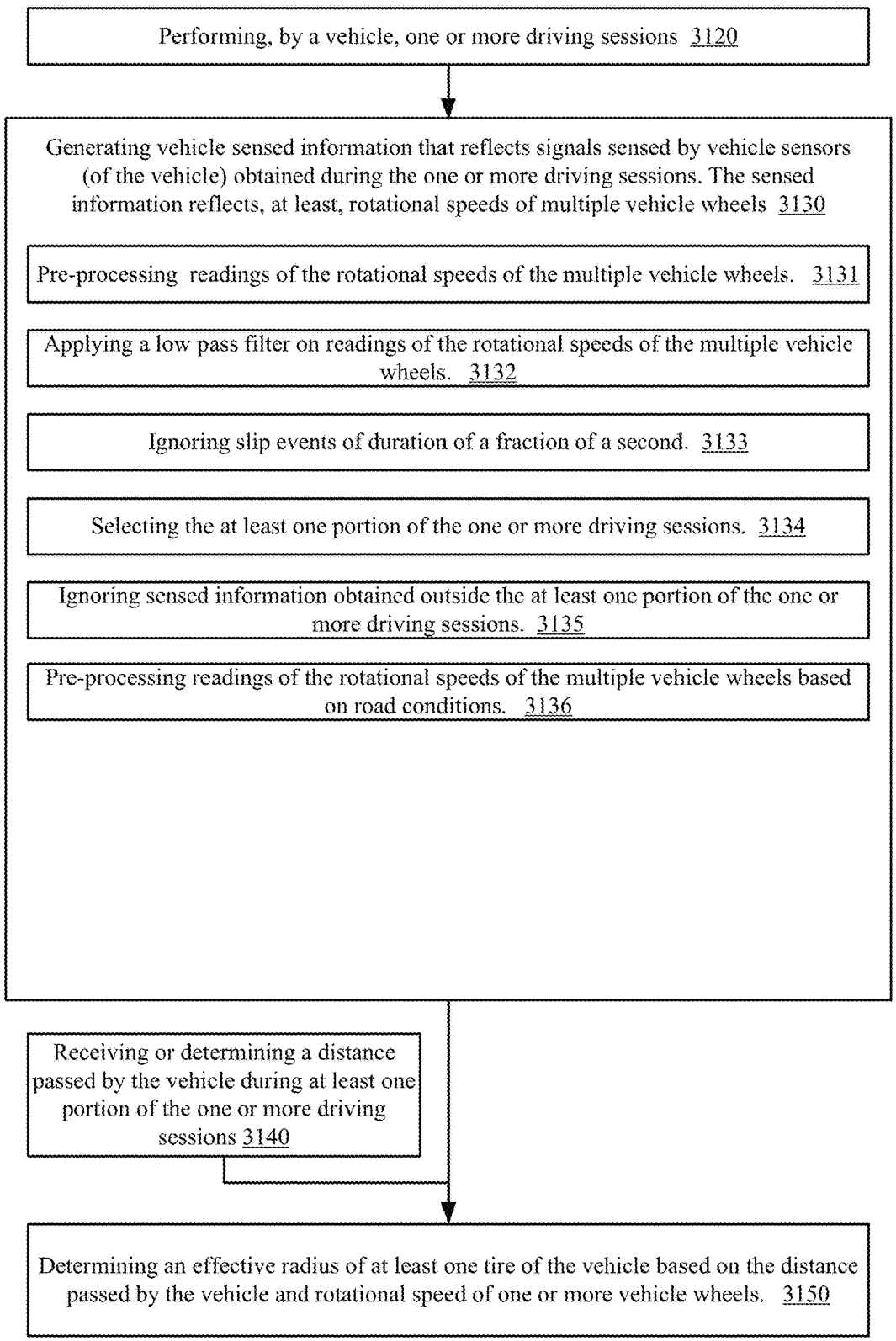
FIG. 3B is an example of a method.

FIG. 3A illustrates method 3100 while FIG. 3B illustrates method 3101.

Method 3100 include steps 3120, 3130, 3140 and 3150.

Step 3120 is followed by step 3130. Steps 3130 and 3140 are followed by step 3150.

Step 3120 may include performing, by a vehicle, one or more driving sessions.

Step 3130 may include generating vehicle sensed information that reflects signals sensed by vehicle sensors (of the vehicle) obtained during the one or more driving sessions. The sensed information reflects, at least, rotational speeds of multiple vehicle wheels.

Step 3140 may include receiving or determining a distance passed by the vehicle during at least one portion of the one or more driving sessions.

Step 3150 may include determining an effective radius of at least one tire of the vehicle based on the distance passed by the vehicle and rotational speed of one or more vehicle wheels.

The distance passed by the vehicle may be measured in various manners—for example tracking after GPS readings indicative of the location of the vehicle, or any other measurement that may provide the distance passed by the vehicle.

The determination of the distance passed by the vehicle may be provided by a monitor located outside the vehicle—such as traffic cameras, satellite, and the like.

For a certain wheel, an integral over time of the rotational speed of the wheel multiplied by the current effective radius of the tire should equal the distance passed by the vehicle.

FIG. 3B illustrates method 3101—and shows various steps (3131, 3132, 3133, 3134, 3135 and 3136) that may be included in step 3130.

Step 3130 may include at least one out of:
a. Pre-processing readings of the rotational speeds of the multiple vehicle wheels. (3131).
b. Applying a various filters on at least the readings of the rotational speeds of the multiple vehicle wheels and other available vehicle sensors. (3132).
c. Selecting the at least one portion of the one or more driving sessions (3134). This may include ignoring information obtained during curves, accelerations and/or decelerations above thresholds, sensed information with signal to noise ratio that is below a SNR threshold, sensed information of a lower that allowed quality, and the like.
d. Ignoring sensed information obtained outside the at least one portion of the one or more driving sessions. (3135).
e. Pre-processing readings of the rotational speeds of the multiple vehicle wheels based on road conditions. (3136). This may include ignoring sensed information obtained during events such as driving over a bump, entering a hole in the road. Examples of sensing or knowing the road conditions—including excitations—are provided in PCT patent application PCT/IB2018/056844 filing date Sep. 7, 2018.

FIG. 3C-3F illustrate methods for determining the impact of each tire radius affecting parameters condition on the current radius of the wheel.

The determination allows to use as reference information about a nominal tire effective radius and normalize each measurement to the nominal condition.

Figure 3C:
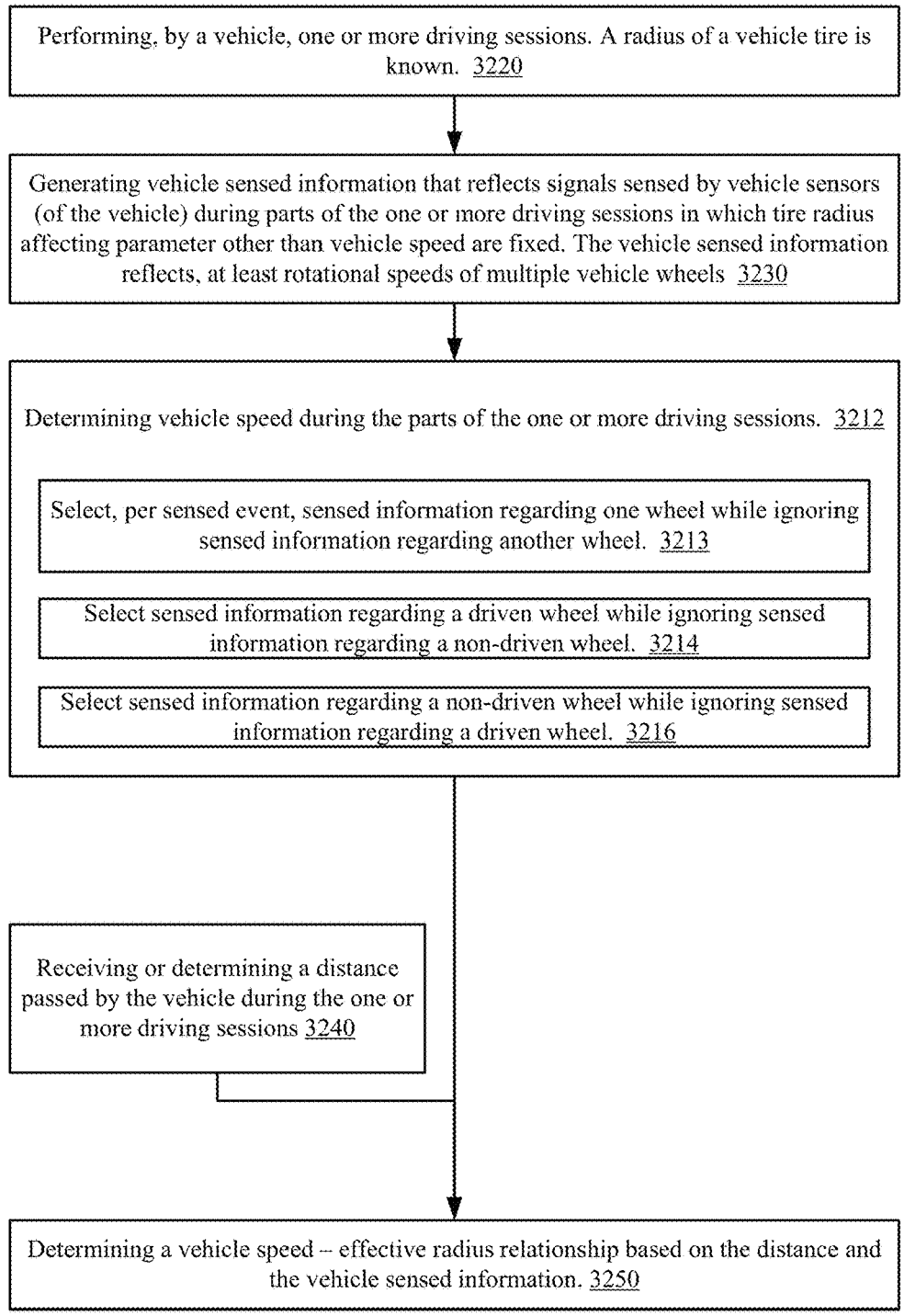
FIG. 3C is an example of a method.

FIG. 3C illustrates method 3200. Method 3200 includes steps 3220, 3230, 3212, 3240 and 3250.

Step 3220 is followed by step 3230 that is followed by step 3212. Steps 3212 and 3240 are followed by step 3250.

Step 3220 includes performing, by a vehicle, one or more driving sessions. A nominal radius of a vehicle tire is known.

Step 3230 includes generating vehicle sensed information that reflects signals sensed by vehicle sensors (of the vehicle) during parts of the one or more driving sessions in which tire radius all controllable affecting parameters other than vehicle speed are fixed. The vehicle sensed information reflects, at least rotational speeds of multiple vehicle wheels.

Step 3212 includes determining vehicle speed during the parts of the one or more driving sessions.

Step 3240 includes receiving or determining a distance passed by the vehicle during the one or more driving sessions.

Step 3250 includes determining a vehicle speed—effective radius relationship based on the distance and the vehicle sensed information.

Step 3212 may include at least one out of:
a. Select, per sensed event, sensed information regarding one wheel while ignoring sensed information regarding another wheel. (3213)
b. Select sensed information regarding a driven wheel while ignoring sensed information regarding a non-driven wheel. (3214).
c. Select sensed information regarding a non-driven wheel while ignoring sensed information regarding a driven wheel. (3216).
d. Step 3212 may include any combinations of at least wheel speeds or other sensors of at least one wheel, for example: a . . . b . . . c . . . ."

Figure 3D:
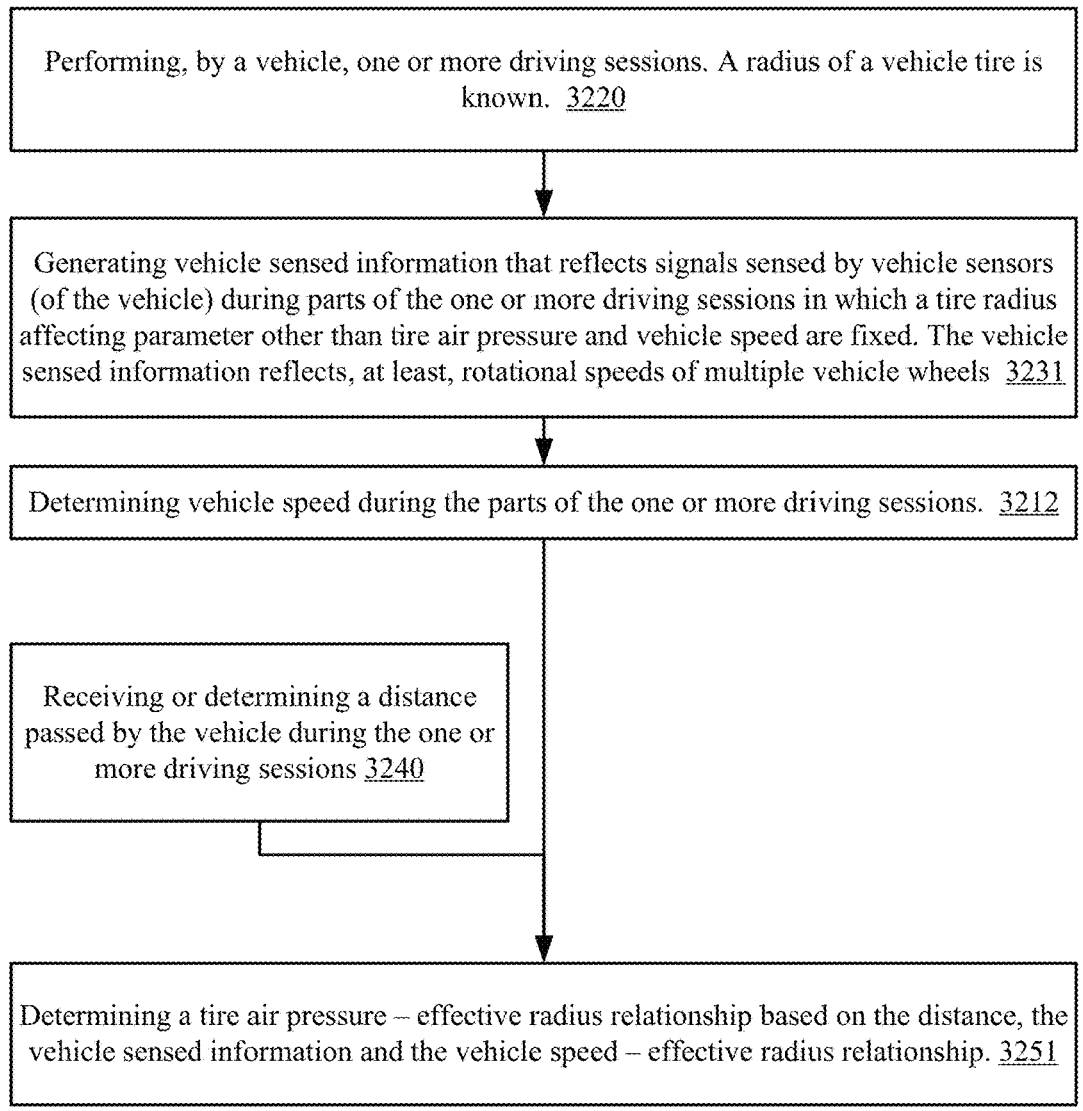
FIG. 3D is an example of a method.

FIG. 3D illustrates method 3201. Method 3201 includes steps 3220, 3231, 3212, 3240 and 3251.

Step 3220 is followed by step 3231 that is followed by step 3212. Steps 3212 and 3240 are followed by step 3251.

Step 3220 includes performing, by a vehicle, one or more driving sessions. A radius of a vehicle tire is known.

Step 3231 includes generating vehicle sensed information that reflects signals sensed by vehicle sensors (of the vehicle) during parts of the one or more driving sessions in which a tire radius all controllable affecting parameters other than tire air pressure and vehicle speed are fixed. The vehicle sensed information reflects, at least, rotational speeds of multiple vehicle wheels.

Step 3212 includes determining vehicle speed during the parts of the one or more driving sessions.

Step 3240 includes receiving or determining a distance passed by the vehicle during the one or more driving sessions.

Step 3251 includes Determining a tire air pressure—effective radius relationship based on the distance, the vehicle sensed information and the vehicle speed—effective radius relationship.

Figure 3E:
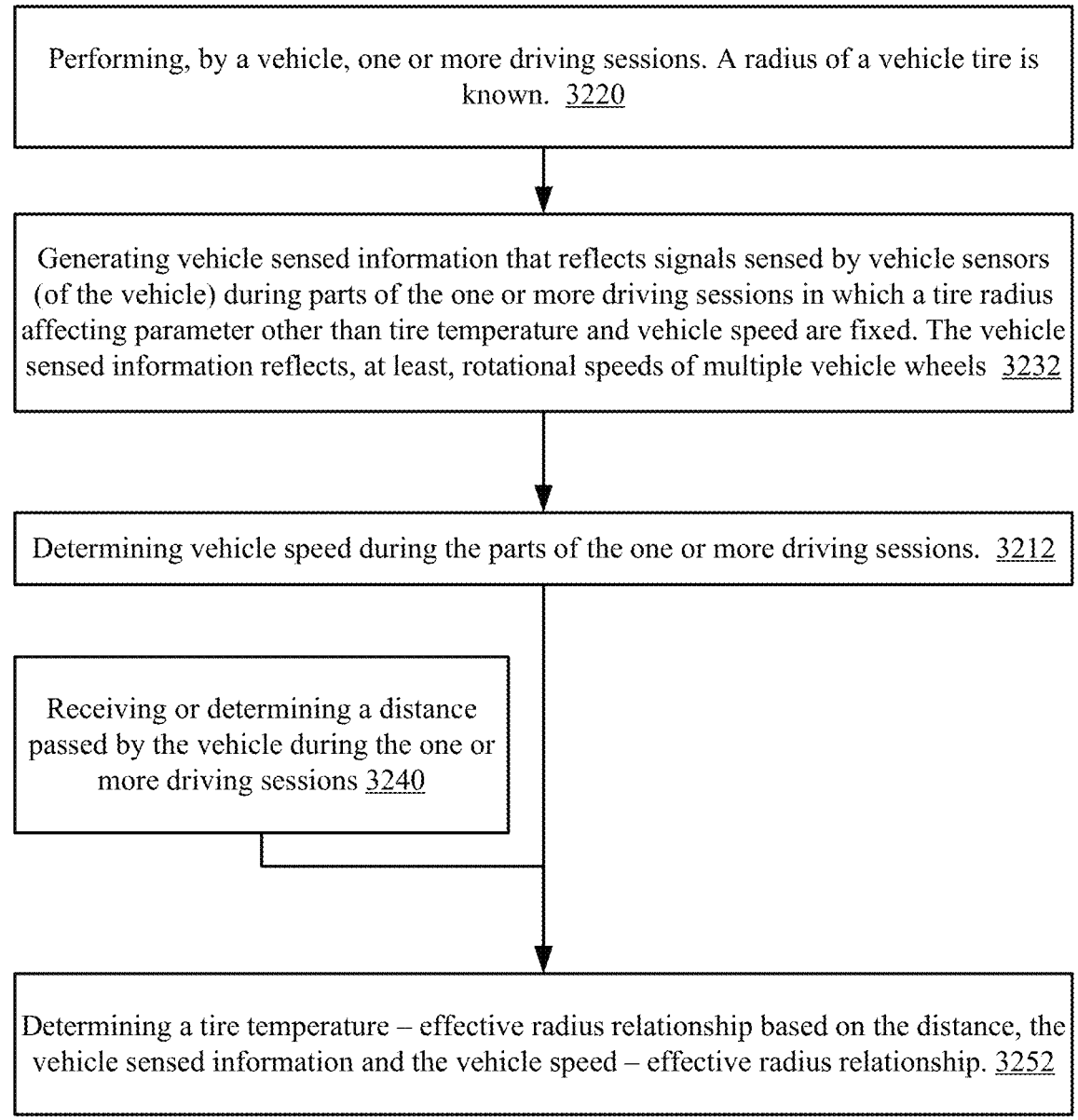
FIG. 3E is an example of a method.

FIG. 3E illustrates method 3202. Method 3202 includes steps 3220, 3232, 3212, 3240 and 3252.

Step 3220 is followed by step 3232 that is followed by step 3212. Steps 3212 and 3240 are followed by step 3252.

Step 3220 includes performing, by a vehicle, one or more driving sessions. A radius of a vehicle tire is known.

Step 3232 includes generating vehicle sensed information that reflects signals sensed by vehicle sensors (of the vehicle) during parts of the one or more driving sessions in which a tire radius all controllable affecting parameter other than tire temperature and vehicle speed are fixed. The vehicle sensed information reflects, at least, rotational speeds of multiple vehicle wheels.

The tire temperature usually stabilizes after driving few minutes.

Different (fixed) tire temperatures may be obtained while driving at different environments and/or at different ambient temperatures.

Step 3212 includes determining vehicle speed during the parts of the one or more driving sessions.

Step 3240 includes receiving or determining a distance passed by the vehicle during the one or more driving sessions.

Step 3252 includes determining a tire temperature—effective radius relationship based on the distance, the vehicle sensed information and the vehicle speed—effective radius relationship.

FIG. 3F illustrates method 3203. Method 3203 includes steps 3220, 3233, 3212, 3240 and 3253.

Step 3220 is followed by step 3233 that is followed by step 3212. Steps 3212 and 3240 are followed by step 3253.

Step 3220 includes performing, by a vehicle, one or more driving sessions. A radius of a vehicle tire is known.

Step 3233 includes generating vehicle sensed information that reflects signals sensed by vehicle sensors (of the vehicle) during parts of the one or more driving sessions in which a tire radius all controllable affecting parameter other than vehicle are fixed. The vehicle sensed information reflects, at least, rotational speeds of multiple vehicle wheels.

Step 3212 includes determining vehicle speed during the parts of the one or more driving sessions.

Step 3240 includes receiving or determining a distance passed by the vehicle during the one or more driving sessions.

Step 3253 includes determining a vehicle weight—effective radius relationship based on the distance, the vehicle sensed information and the vehicle speed—effective radius relationship.

Any of the methods of FIGS. 3D-3F may be applied on parameters that differ from those illustrated above and may estimate parameters differ from these estimated above. These methods may be applied to estimate non-tested parameters based on "tested parameters" and "non tested parameters" therefore allowing the method to be relevant and applicable to finding the connections between all tire radii influencing parameters.

A non-limiting example of measuring the vehicle weight are provided in PCT patent application PCT/IB2018/056844 filing date Sep. 7, 2018.

Figure 3G:
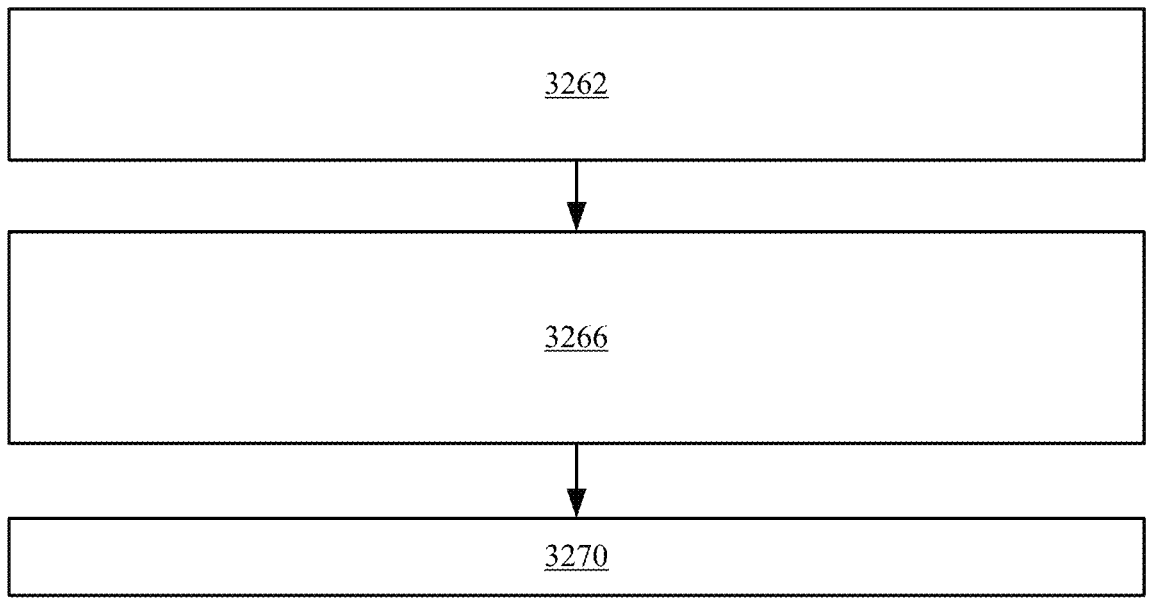
FIG. 3G is an example of a method.

FIG. 3G illustrates an example of method 3260 for estimating an effective radius of a tire of a vehicle.

Step 3260 may start by step 3262 of obtaining sensed information that reflects (a) a distance passed by the vehicle during one or more driving sessions, (b) a rotational speed of at least a wheel that comprises the tire during the one or more driving sessions, (c) values of tire radius affecting parameters during the one or more driving sessions, wherein the tire radius affecting parameters comprise a vehicle speed and at least some other tire radius affecting parameters.

Step 3262 may be followed by step 3266 of selecting at least one portion of the one or more driving sessions.

Step 3266 may include at least one of steps 3133, 3135, and the like.

Step 3266 may include at least one out of:
a. Finding segments in which the grip is below a certain threshold (the threshold be fixed, may be a function of one or more environmental parameters, and the like)

and ignoring these segments—not selecting them. The length of the segments may range from less than a meter, a few meters, few tens of meters, and even more. A segment may span between two different locations values—for example between two consecutive GPS readings.
b. Ignoring slip events.
c. Ignoring portions that comprise slip events.
d. Selecting at least one portion based on a grip.
e. Rejecting one or more portions that comprise driving over curves.
f. Rejecting one or more portions in which the vehicle exhibited accelerations above acceleration thresholds.
g. Rejecting one or more portions in which at least a part of the sensed information had a signal to noise ratio that was below a signal to noise threshold.
h. Rejecting one or more portions in which at least a part of the sensed information had a quality below a quality threshold.
i. Ignoring rotational speed information obtained during at least one out of (a) driving over a bump, and (b) entering a hole.
j. Ignoring sensed information obtained during the one or more driving sessions but outside the at least one portion.

Step 3266 may be followed by step 3270 of determining the effective radius of the tire of the vehicle based on (a) sensed information gained during the at least one portion, the sensed information comprises values of the tire radius affecting parameters during the at least one portion, and (b) one or more relationships between the effective radius of the tire and tire radius affecting parameters.

Examples of such relationships can be found in steps 3251, 3252 and 3253 of FIGS. 3D, 3E and 3F.

Method 3260 may include learning or receiving the relationships between the effective radius of the tire and tire radius affecting parameters during test driving sessions.

Determining a Depth of Tire Grooves

The depth of the grooves of a tire may be estimated by (a) obtaining a reference measurement of the depth of the grooves (for example—getting the reference measurement from the specification of a new tire, or physically measuring the depth of the grooves (Groove_Depth_REF), (b) obtaining a reference measurement of the radius of the tire (for example—getting the reference measurement from the specification of a new tire) (Tire_Radius_REF), and (c) tracking after changes in a depth-of-grooves-relevant effective (DGRE) radius of the tire—whereas any decrease in the DGRE radius represents a decrement in the depth of the grooves.

The current depth of the grooves (Groove_Depth_current) can be calculated by:

Groove_Depth_current=Groove_Depth_REF−(Tire_
Radius_REF—DGRE radius of the tire).

The DGRE radius of the tire is calculated by ignoring sensed information obtained by irrelevant road segments. Irrelevant road segments may include road segments in which the temperature of the environment exceeded a predefined threshold (for example 30, 33, 36 Celsius), segments in which the acceleration/deceleration (absolute value) exceeds a deceleration/deceleration threshold, segments in which the speed exceeds a speed threshold, and the like.

For example—step 3266 mentioned above may include ignoring sensed information obtained by irrelevant road segments. Irrelevant road segments may include road segments in which the temperature of the environment exceeded a predefined threshold (for example 30, 33, 36 Celsius), segments in which the acceleration/deceleration (absolute value) exceeds a deceleration/deceleration threshold, segments in which the speed exceeds a speed threshold, and the like.

Determining a Type of a Tire

Tire types may include all season tires, summer tires, winter tires, and the like. Each type of tire is manufactured to fit a certain range of ambient conditions (such as a temperature range, rain condition, and the like).

Tires that fit a certain range of ambient conditions may behave poorly outside the certain range of ambient conditions. For example, a summer tire may be very stiff at very low temperatures.

There is a growing need to automatically determine the type of tire. The determination may assist in determining vehicle state and limitations (for example available grip, water evacuation, and the like), may assist in automatic functionalities of the vehicle (such as ABS), autonomously driving a vehicle, as well as setting limits (suggested limits, or vehicle enforced limits) on the behavior of the vehicle, and the like.

Figure 4A:
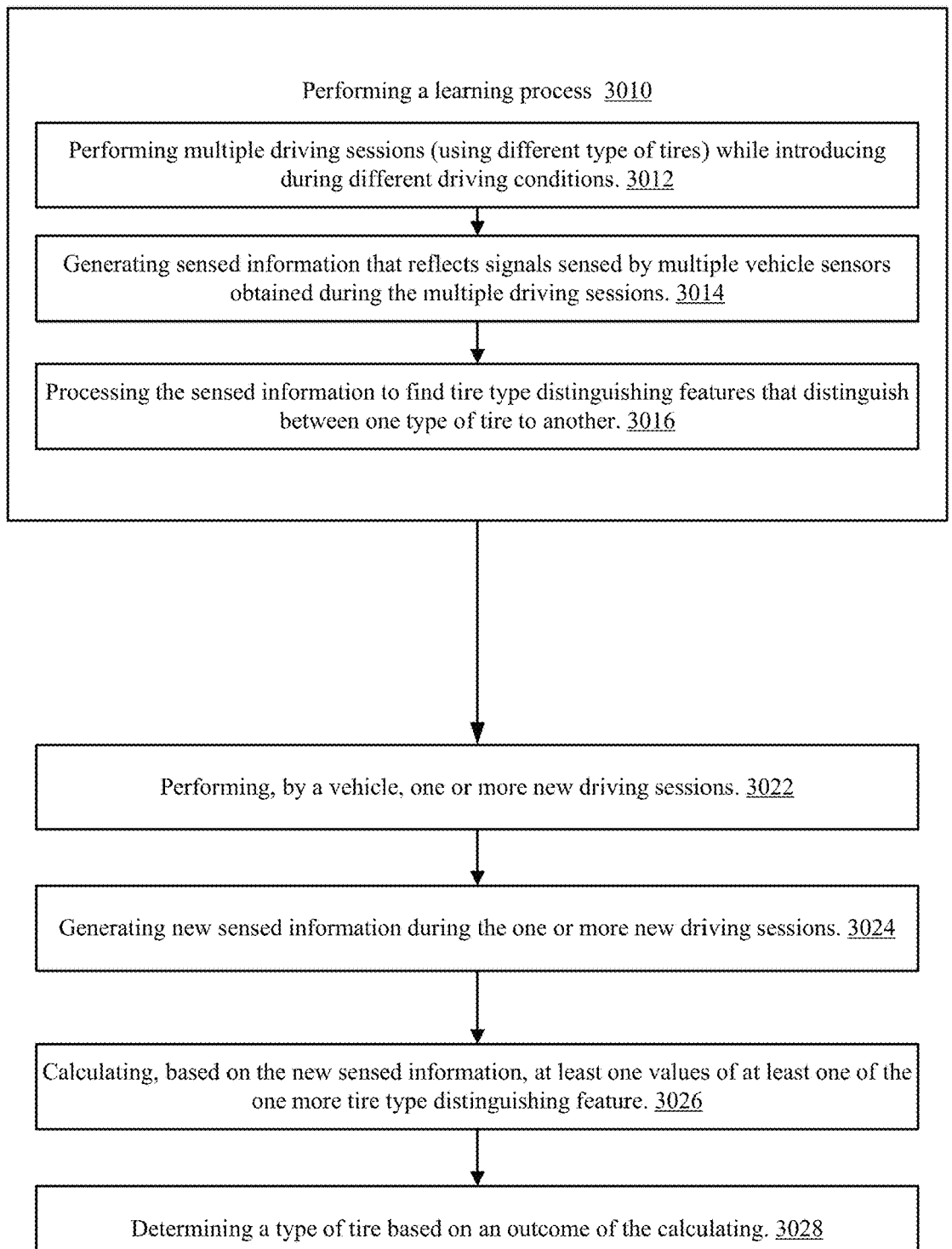
FIG. 4A is an example of a method.
Figure 4B:
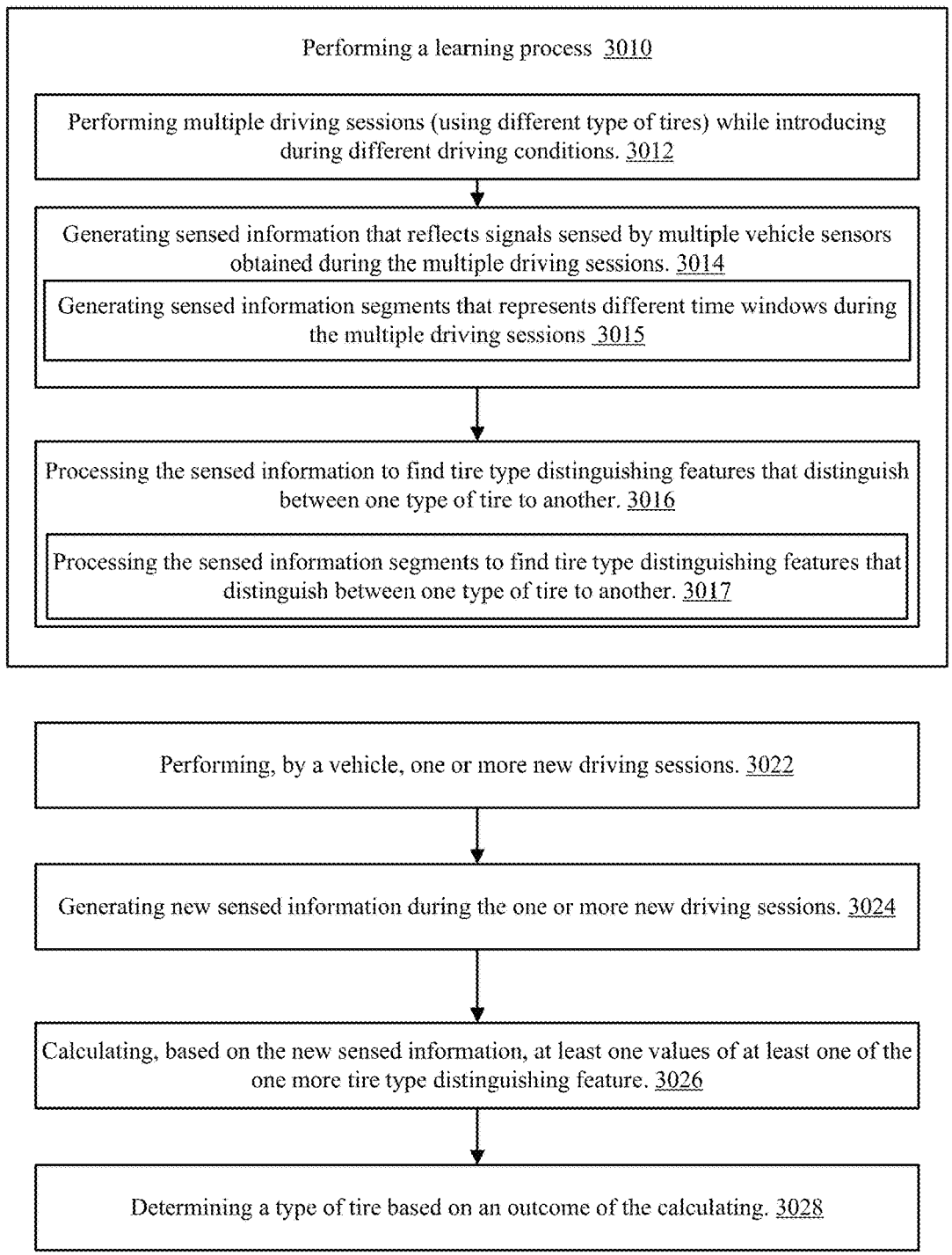
FIG. 4B is an example of a method.

FIGS. 4A-4B illustrates methods 3000 and 3001 for determining a tire type.

Method 3000 may start by step 3010 of performing a learning process.

Step 3010 may include at least one of steps 3012, 3014, and may include step 3016.

Step 3012 may include performing multiple driving sessions (while using different tires in at least some of the driving sessions) while introducing different driving conditions.

Thus—one or more driving sessions may be performed using one type of tire while one or more other driving sessions may be performed using another type of tire. More than two different types of tires may be tested.

The different driving conditions may include different vehicle speed, different paths, different temperatures, different humidity/rain, different speed different gear position, and the like.

Step 3014 may include generating sensed information that reflects signals sensed by multiple vehicle sensors obtained during the multiple driving sessions.

The sensed signals may include signals obtained from one or more vehicle sensors such as wheel speed sensors, accelerometer, gear sensors, motor sensors, torque sensors, brake sensors, yaw sensors, and the like. Any sensor may be a physical sensor or a virtual sensors. The signals may be provided from the sensors, vehicle computers or other processors that preprocess the signals, and the like. The signals may be obtained, for example, over one or more communication buses and/or links such as the CANBUS.

Step 3016 may include processing the sensed information to find tire type distinguishing features that distinguish between one type of tire to another.

A feature may refer to signals related to one or more sensors. A feature may be generated by applying any function on any group of sensed signals.

Step 3016 may include applying a classification process (for example—support vector machine), may include applying a machine learning process, and the like.

The learning process 3010 provides tire type distinguishing features that can be used to determine the type of the tire in future driving sessions.

Thus—step 3010 may be followed by steps 3022, 3024, 3026 and 3028.

Step 3022 may include performing, by a vehicle, one or more new driving sessions. It should be noted that On an unknown tire that is not part of the training set, the method may collect specific data for that tire. That is why may is out of place.

Step 3024 may include generating new sensed information during the one or more new driving sessions.

Step 3026 may include calculating, based on the new sensed information, at least one values of at least one of the tire types distinguishing feature.

Step 3028 may include determining a type of tire based on an outcome of the calculating.

A feature may represent signals from one or more sensors during short time segments (for example of less than a second till few seconds long).

As illustrated in FIG. 4B, step 3014 may include step 3015 of generating sensed information segments that represents different time windows during the multiple driving sessions.

In addition—step 3016 may include step 3017 of processing the sensed information segments to find tire type distinguishing features that distinguish between one type of tire to another.

Weight Estimation

There may be provide a method for estimating a weight (or a mass) of a vehicle.

The weight of the vehicle can be evaluated based on energy consumed by the vehicle in various path segments and on the energy gained by the fuel consumption.

The weight of the vehicle can be evaluated based on assumptions related to a motor efficiency function and a fuel consumption errors associated with fuel consumption measurements. The motor efficiency function represents the relationship between consumed fuel and output (mechanical) energy.

The evaluation process may be performed in an iterative manner, in which one or more assumptions that were used for calculating the evaluated weight can be re-evaluated given the evaluated weight. The same iterative approach may be applied to the estimate of the motor efficiency function and/or to the fuel consumption errors.

The evaluation process of the weight and/or any estimation process (that is based on the estimated weight) can be done at any complexity and/or by any computerized system—either by a vehicle computer or an out-of-vehicle server or computer. For example, the out-of-vehicle computer may initially evaluate the energy coefficients using a vast number (thousands or more) of measurements. The vehicle computer may receive the initially evaluated energy coefficients and use them (in addition to more measurements obtained by the vehicle sensors) to update (even in real time) the weight estimate of the vehicle.

Initial or other estimates of energy coefficients, motor efficiency function values and/or to the fuel consumption errors values related to a certain vehicle may be based on the behavior of vehicles that belong to the same class of vehicles. A class of vehicles may be vehicles of the same model, same manufacturer and/or same year of production. Additionally or alternatively, the vehicle may be classified and/or re-classified based on the weight measurements of the vehicle.

The evaluation process may examine multiple combinations of values of energy coefficients, motor efficiency function values and/or to the fuel consumption errors values.

Any search process may be applied. The entire set of combinations may be evaluated or only a part of the entire set of combination may be evaluated.

The search process may take into account a quality attribute associated with a path segment. The quality attribute may be used to filter measurements related to path segments and/or may be used in another manner.

For example, the weight of a vehicle can be evaluated based on an evaluation of work and energy gained by the fuel consumed.

A weight of a vehicle may be evaluated during a learning period (or a learning period). During the learning period, the monitored vehicle passes through multiple paths. The multiple paths may be segmented to path segments.

The work and energy gained by the fuel consumed may be estimated per each path segment.

The method may include obtaining various energy coefficients and performing various measurements per multiple driving session segment (for example of a length of between a few meters till a few hundred meters or more).

The values of the energy coefficient values may be evaluated over any range and at any resolution. For example—k1 may range between 0 and 10,000 and be evaluated at a resolution (steps) of 1000 (0, 1000, 2000, 3000 . . . ), and each one of k2, k3 and k4 may range between 0 and 1 and be evaluated at a resolution of 0.01 (0, 0.01, 0.02, 0.03 . . . ).

A search process may include calculating the weight estimates for a plurality of path segments. The plurality of path segments may include all the path segments of all paths that were passed by the vehicle during the learning period or only some of the paths segments.

A path segments may be ignored (filtered out) for one or more reasons such as an insufficient quality.

Non-limiting examples of path segmentation and/or filtering out and/or assigning a quality attribute are provided below:

a. Path segment may be relatively short (in time)—for example below half a minute. The duration of the path is a tradeoff between the need to obtain enough data, expecting that at least some variables will be substantially constant during the entire path segment and having enough valid path segments within a single driving session. The longer the path segment the higher the quality.

b. Ignore path segments (or assign low quality) in which the vehicle descended—thereby avoiding braking losses, and since in such path segments the fuel is cut from engine.

c. Motor revolutions per minute (RPM)—higher RPM difference (between start and end of path segment)—the higher the quality.

d. Assign higher quality to path segments having bigger momentum (momentum is the difference between the square of the velocity at the end of a path segment and the square of the velocity at the start of a path segment. Insufficient momentum (below a momentum threshold—such as 50 [m^2/Sec^4])—may be ignored of—or be assigned a very low quality.

e. Ignore path segments (or assign low quality)—in which the velocity exceeded a certain speed threshold (for example—above 70 Km/h)—due to quantization errors.

f. Ignore path segments (or assign low quality) in which the overall fuel consumption rate is below a threshold (for example −3 [L/hour])

g. Assign higher quality level to path segments that include steeper climbs of the vehicle.

h. Prevent a single path from including stops that are long enough to enable substantial weight changes of the vehicles. For example—if unloading 500 kilograms of goods lasts two minutes—then an occurrence of such a stop that is at least two minutes long may mark the border between two path segments.

The suggested weight evaluation is accurate and may require limited computational resources. The suggested weight evaluation compensates for inaccuracies of measurements performed by vehicle sensors and enables using low cost limited accuracy sensors.

Figure 5:
FIG. 5 is an example of a method.

FIG. 5 illustrates method 300 for evaluating a weight of a vehicle.

Method 300 may start by step 310 of obtaining during a learning period and by vehicle sensors, vehicle sensor measurements regarding driving sessions of the vehicle.

Step 310 may be followed by step 320 of calculating, based on the vehicle sensor measurements, an evaluated weight of the vehicle.

The calculating is based on values of energy coefficients that are indicative of energy wasted by the vehicle.

The energy coefficients may include a first energy coefficient (k1) that is calculated based on grip, tire state and road state.

The first energy coefficient is calculated based on a relationship between grip value and energy waste, a relationship between tire state and energy waste, and a relationship between road state and energy waste.

The calculating of the first energy coefficient (k1) may include summing (a) a product of the grip (grip_value) multiplied by a grip to energy waste coefficient (k1_g), (b) a product of the tire state (tire_state) and a tire state to energy waste coefficient (k1_t), and (c) a product of the road state and a road state (rr) to energy waste coefficient (k1_r).

The method may include calculating the grip to energy waste coefficient (k1_g), the tire state to energy waste coefficient (k1_t), and the road state (rr) to energy waste coefficient (k1_r) using information generated by virtual sensors that comprise a virtual grip sensor, a virtual tire health sensor and a virtual surface event sensor.

The calculating of the second energy coefficient (k2) may include summing (a) a product of the grip (grip_value) multiplied by a grip to energy waste coefficient (k2_g), (b) a product of the tire state (tire_state) and a tire state to energy waste coefficient (k2_t), and (c) a product of the road state and a road state (rr) to energy waste coefficient (k2_r).

The method may include calculating the grip to energy waste coefficient (k2_g), the tire state to energy waste coefficient (k2_t), and the road state (rr) to energy waste coefficient (k2_r) using information generated by virtual sensors that comprise a virtual grip sensor, a virtual tire health sensor and a virtual surface event sensor.

The vehicle sensor measurements may include (a) height measurements of paths related to the driving sessions, (b) fuel consumption measurements related to the driving sessions, (c) length measurements of the of road segments related to the driving sessions; and (d) velocity measurements related to the driving sessions.

The calculating may include searching for values of the energy coefficients that provide at least one distribution related to weight estimates of the vehicle, the at least one distribution fulfills at least one predefined statistical significance criterion.

The determining of the evaluated weight may include determining weight estimates for each path segment of the plurality of path segments, according to the following equation:

$$m = \frac{\alpha me \cdot fe \cdot \text{fuel} - k_1 x - k_3 x v^2}{g\Delta h + \frac{(v_2^2 - v_1^2)}{2} + k_2 x + k_4 x v^2}$$

wherein the group of energy coefficients further comprises $k_2$, $k_3$ and $k_4$;

wherein ame is a value of the estimated motor efficiency function;

wherein $v_2$ is a velocity of the vehicle at an end of the path segment;

$v_1$ is a velocity of the vehicle at a start of the path segment;

v represents at least one value of a velocity of the vehicle when driving over the path segment;

x is a length of the path segment;

$\Delta h$ is a height difference between the end and the start of the path segment; and fuel is an error corrected fuel consumption related to the path segment.

The calculating may include searching for values of the energy coefficients that provide at least one distribution related to weight estimates of the vehicle, the at least one distribution fulfills at least one predefined statistical significance criterion.

The predefined statistical significance criterion is a maximal statistical significance.

The predefined statistical significance criterion is a smallest standard deviation of at least one of the weight estimate distributions.

The predefined statistical significance criterion may be a smallest standard deviation of at least one of the weight estimate distributions.

The determining of the evaluated weight may include determining weight estimates for each path segment of the plurality of path segments and for different values of the energy coefficients.

The determining of the evaluated weight may include determining weight estimates for each path segment of the plurality of path segments, for different values of the energy coefficients and for different motor efficiency function values.

The determining of the evaluated weight may include determining weight estimates for each path segment of the plurality of path segments, for different values of the energy coefficients and for different fuel consumption error correction function values.

The determining of the evaluated weight may include determining weight estimates for each path segment of the plurality of path segments, for different values of the energy coefficients, for different motor efficiency function values and for different fuel consumption error correction function values.

The determining of the evaluated weight may include associating a quality attribute with each weight estimate.

The determining of the evaluated weight may include associating a quality attribute with each weight estimate, wherein the at least one distribution related to weight estimates of the vehicle may be responsive to the quality attribute assigned to each weight estimate.

The determining of the evaluated weight may include associating a quality attribute with each weight estimate, wherein the at least one distribution related to weight estimates of the vehicle may be a histogram, wherein the histogram may include bins, wherein each bin may be associated with a weight estimate range and has a value that represents quality attributes of weight estimates that belong to the bin.

The determining of the evaluated weight may include associating a quality attribute with each weight estimate, wherein the at least one distribution related to weight estimates of the vehicle may be a histogram, wherein the histogram may include bins, wherein each bin may be associated with a weight estimate range and has a value that represents a sum of quality attributes of weight estimates that belong to the bin.

The method may include assigning quality attributes to at least some of the vehicle sensor measurements.

The method may include assigning quality attribute to vehicle sensor measurements related to a certain path segment based on a difference related to velocities of the vehicle at a start and at an end of the certain path segment.

The method may include assigning quality attribute to vehicle sensor measurements related to a certain path segment based on a maximal velocity of the vehicle during the certain driving session.

The method may include ignoring vehicle sensor measurements obtained at path segments in which the vehicle descended.

The calculating may include applying machine learning.

The determining of the evaluated weight comprises determining weight estimates for each path segment of a plurality of path segments and for different values of the energy coefficients.

The method may include learning the energy coefficients during test driving sessions.

The energy coefficients further comprise a wind force to energy waster coefficient (k2'), a constant force constant which can be viewed as a "DC" component and can be calculated when calculating the energy coefficients, a speed constant, and an acceleration of the vehicle.

The determining of the evaluated weight comprises determining weight estimates for each path segment of a plurality of path segments, according to the following equation:

$$M*a=(k1*\Sigma_{all\ wheels}\ \text{WheelForce})+(k2*\text{wind\_force})-\text{grvity\_constant\_force}-(k3*\text{speed})-k2*M.$$

Wherein M is a mass of the vehicle, WheelForce is . . . , wind_force is a function of air resistance to the vehicle, WheelForce is the driving force of the car at the tire, wind_force is a function of air resistance to the vehicle, constant_force is independent and constant loses like internal friction.

The wind_force may equal 0.22*calc_air_density*(speed/3.6)$^2$*1.5, whereas calc_air_density equals 1.201*{290*(air_pressure−0.378*relative_humidity)}/{1000*(air_temperature+273.15)}/100. Other values and other functions may be used.

The energy coefficients may be learnt during test driving sessions.

Figure 6:
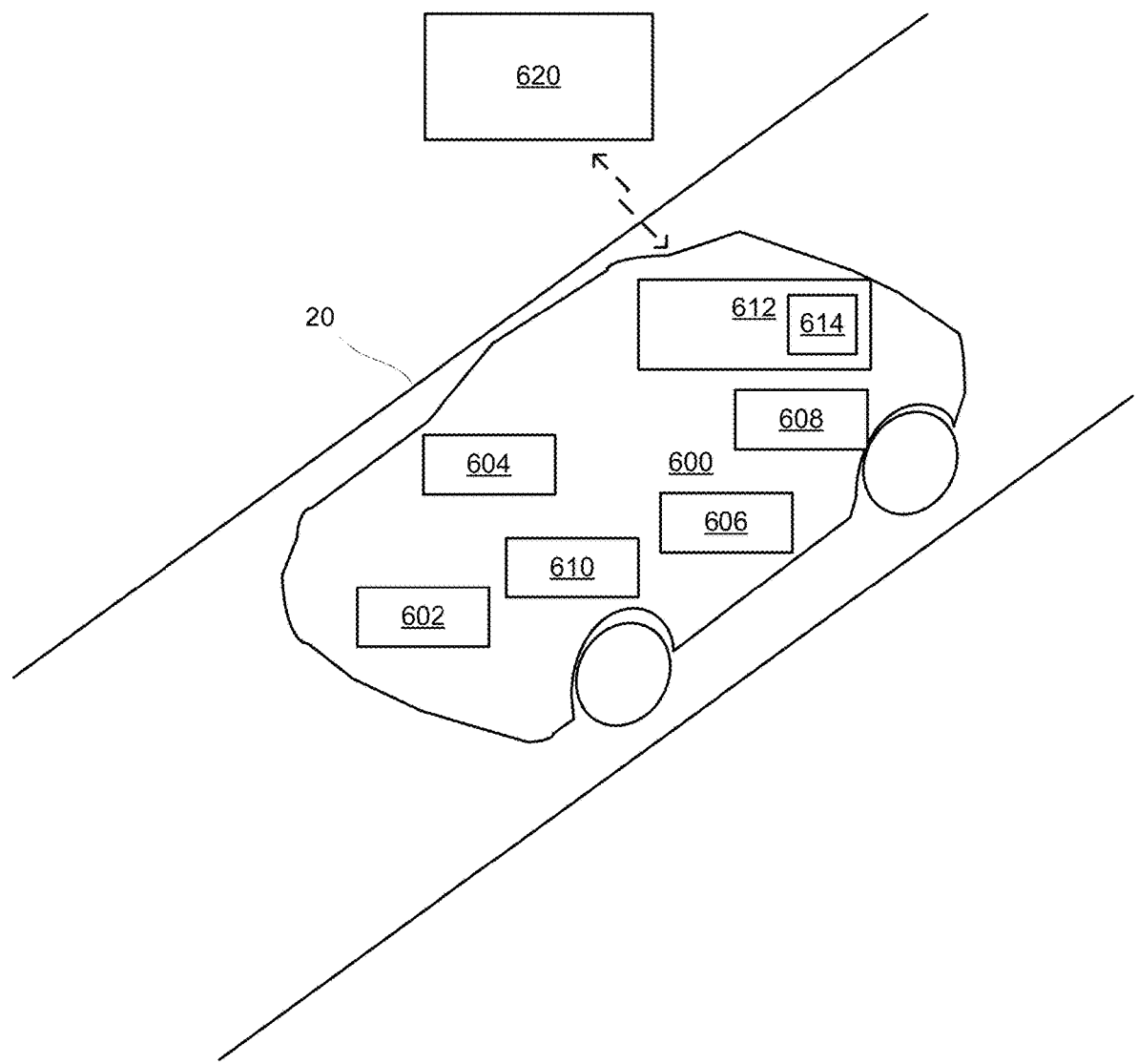
FIG. 6 is an example of a vehicle and a remote system.

FIG. 6 illustrates a vehicle 600 and a computerized system 620 located outside the vehicle.

The vehicle may include physical sensors 602, virtual sensors 604, a computer (and/or a processor and/or a control unit) 606, MCMs 608, components 610 and memory unit 612 for storing information and/or metadata 614—such as any data structure illustrated in the specification. The computerized system 620 may any data structure illustrated in the specification.

The computer 606 and/or the computerized system 620 is configured to execute any of the mentioned above methods.

There may be provided a method for evaluating a status of a vehicle, the method may include obtaining sensed information during one or more driving sessions of the vehicle; determining, based on the sensed information, (a) multi-component-model (MCM) behavioral information regarding one or more MCM driving events, and (b) a component behavioral information regarding one or more component driving events; wherein a behavior of at least one first part of the vehicle during the one or more MCM driving events is indicative of a status of one or more MCMs; wherein a behavior of at least one second part of the vehicle during the one or more component driving event is indicative of a status of one or more components; determining the status of the one or more MCMs, based at least on the MCM behavioral information; and determining the status of the one or more components, based at least on the component behavioral information, the status of the component.

There may be provided a non-transitory computer readable medium for evaluating a status of a vehicle, the non-transitory computer readable medium may store instructions for obtaining sensed information during one or more driving sessions of the vehicle; determining, based on the sensed information, (a) multi-component-model (MCM) behavioral information regarding one or more MCM driving events, and (b) a component behavioral information regarding one or more component driving events; wherein a behavior of at least one first part of the vehicle during the one or more MCM driving events is indicative of a status of one or more MCMs; wherein a behavior of at least one second part of the vehicle during the one or more component driving event is indicative of a status of one or more components; determining the status of the one or more MCMs, based at least on the MCM behavioral information; and determining the status of the one or more components, based at least on the component behavioral information, the status of the component.

There may be provided a system for evaluating a status of a vehicle, the system may include at least one processor configured to obtain sensed information during one or more driving sessions of the vehicle; determine, based on the sensed information, (a) multi-component-model (MCM) behavioral information regarding one or more MCM driving events, and (b) a component behavioral information regarding one or more component driving events; wherein a behavior of at least one first part of the vehicle during the one or more MCM driving events is indicative of a status of one or more MCMs; wherein a behavior of at least one second part of the vehicle during the one or more component driving event is indicative of a status of one or more components; determine the status of the one or more MCMs, based at least on the MCM behavioral information; and determine the status of the one or more components, based at least on the component behavioral information, the status of the component.

There may be provided a method for evaluating a status of a vehicle, the method may include obtaining sensed information regarding mechanical forces applied on one or more first components of the vehicle, wherein the sensed information is indicative of at least (a) first directions of the forces, and (b) at least other parameter related to the forces; estimating, by a vehicle computer, the aggregate damage caused by the mechanical forces to one or more second components of the vehicle, per each of a plurality of second directions; and generating a representation of the aggregate vehicle damage each of the plurality of second directions per location.

There may be provided a non-transitory computer readable medium for evaluating a status of a vehicle, the non-transitory computer readable medium may store instructions for obtaining sensed information regarding mechanical forces applied on one or more first components of the vehicle, wherein the sensed information is indicative of at least (a) first directions of the forces, and (b) at least other parameter related to the forces; estimating, by a vehicle computer, the aggregate damage caused by the mechanical forces to one or more second components of the vehicle, per each of a plurality of second directions; and generating a representation of the aggregate vehicle damage each of the plurality of second directions per location.

There may be provided a system for evaluating a status of a vehicle, the system may include at least one processor configured to obtain sensed information regarding mechanical forces applied on one or more first components of the vehicle, wherein the sensed information is indicative of at least (a) first directions of the forces, and (b) at least other parameter related to the forces; estimate the aggregate damage caused by the mechanical forces to one or more second components of the vehicle, per each of a plurality of second directions; and generate a representation of the aggregate vehicle damage each of the plurality of second directions per location.

There may be provided a method for estimating an effective radius of a tire of a vehicle, the method may include obtaining sensed information that reflects (a) a distance passed by the vehicle during one or more driving sessions, (b) a rotational speed of at least a wheel that may include the tire during the one or more driving sessions, (c) values of tire radius affecting parameters during the one or more driving sessions, wherein the tire radius affecting parameters comprise a vehicle speed and at least some other tire radius affecting parameters; selecting at least one portion of the one or more driving sessions; and determining the effective radius of the tire of the vehicle based on (a) sensed information gained during the at least one portion, the sensed information may include values of the tire radius affecting parameters during the at least one portion, and (b) one or more relationships between the effective radius of the tire and tire radius affecting parameters.

There may be provided a non-transitory computer readable medium for estimating an effective radius of a tire of a vehicle, the non-transitory computer readable medium may store instructions for obtaining sensed information that reflects (a) a distance passed by the vehicle during one or more driving sessions, (b) a rotational speed of at least a wheel that may include the tire during the one or more driving sessions, (c) values of tire radius affecting parameters during the one or more driving sessions, wherein the tire radius affecting parameters comprise a vehicle speed and at least some other tire radius affecting parameters; selecting at least one portion of the one or more driving sessions; and determining the effective radius of the tire of the vehicle based on (a) sensed information gained during the at least one portion, the sensed information may include values of the tire radius affecting parameters during the at least one portion, and (b) one or more relationships between the effective radius of the tire and tire radius affecting parameters.

The terms "including", "comprising", "having", "consisting" and "consisting essentially of" are used in an interchangeable manner. For example—any method may include at least the steps included in the figures and/or in the specification, only the steps included in the figures and/or the specification.

In the foregoing specification, the invention has been described with reference to specific examples of embodiments of the invention. It will, however, be evident that various modifications and changes may be made therein without departing from the broader spirit and scope of the invention as set forth in the appended.

Moreover, the terms "front," "back," "rear" "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units, or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Those skilled in the art will recognize that the boundaries between various components are merely illustrative and that alternative embodiments may merge various components or impose an alternate decomposition of functionality upon various components. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" Each other such that the desired functionality is achieved, irrespective of architectures or intermedial components. Likewise, any two components so associated can also be viewed as being "operably connected," or "operably coupled," to Each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

Any combination of any component of any component and/or unit of a system or device or apparatus that is illustrated in any of the figures and/or specification and/or the claims may be provided.

Any combination of any systems and/or devices and/or apparatuses illustrated in any of the figures and/or specification and/or the claims may be provided.

Any combination of steps, operations and/or methods illustrated in any of the figures and/or specification and/or the claims may be provided.

Any combination of operations illustrated in any of the figures and/or specification and/or the claims may be provided.

Any combination of methods illustrated in any of the figures and/or specification and/or the claims may be provided.

There may be provided one or more non-transitory computer readable medium that may store instructions for executing combination of steps, operations and/or methods illustrated in any of the figures and/or specification and/or the claims.

There may be provided one or more apparatuses and/or systems and/or units that are constructed and arranged to execute any combination of steps, operations and/or methods illustrated in any of the figures and/or specification and/or the claims.

The terms configured to and constructed and arranged to are used in an interchangeable manner.

The phrase "may be X" indicates that condition X may be fulfilled. This phrase also suggests that condition X may not be fulfilled.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

In the claims, any reference signs placed between parentheses shall not be construed as limiting the claim. The word 'comprising' does not exclude the presence of other elements or steps than those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for estimating an effective radius of a tire of a vehicle, the method comprises:
    obtaining sensed information that reflects (a) a distance passed by the vehicle during one or more driving sessions, (b) a rotational speed of at least a wheel that comprises the tire during the one or more driving sessions, (c) values of tire radius affecting parameters during the one or more driving sessions, wherein the tire radius affecting parameters comprise a vehicle speed;
    selecting at least one portion of the one or more driving sessions; and
    determining the effective radius of the tire of the vehicle based on (a) sensed information gained during the at least one portion, the sensed information comprises values of the tire radius affecting parameters during the at least one portion, and (b) one or more relationships between the effective radius of the tire and tire radius affecting parameters.

2. The method according to claim 1 comprising ignoring sensed information obtained during the one or more driving sessions but outside the at least one portion.

3. The method according to claim 1 wherein the selecting of the at least portion comprises ignoring slip events.

4. The method according to claim 1 wherein the selecting of the at least portion comprises ignoring portions that comprise slip events.

5. The method according to claim 1 comprising selecting at least one portion based on a grip.

6. The method according to claim 1 comprising rejecting one or more portions that exhibit a grip that is below a grip threshold.

7. The method according to claim 1 comprising rejecting one or more portions that comprise driving over curves.

8. The method according to claim 1 comprising rejecting one or more portions in which the vehicle exhibited accelerations above acceleration thresholds.

9. The method according to claim 1 comprising rejecting one or more portions in which at least a part of the sensed information had a signal to noise ratio that was below a signal to noise threshold.

10. The method according to claim 1 comprising rejecting one or more portions in which at least a part of the sensed information had a quality below a quality threshold.

11. The method according to claim 1 comprising ignoring rotational speed information obtained during at least one out of (a) driving over a bump, and (b) entering a hole.

12. The method according to claim 1 comprising learning the relationships between the effective radius of the tire and tire radius affecting parameters during test driving sessions.

13. The method according to claim 12 wherein the one or more relationships comprise a vehicle speed—effective radius relationship that is learnt during first test driving sessions, a tire air pressure—effective radius relationship that is learnt during second test driving sessions, a vehicle weight—effective radius relationship that is learnt during third test driving sessions, and vehicle weight—effective radius relationship that is learnt during first fourth driving sessions.

14. The method according to claim 1 comprising selecting, per sensed event, sensed information regarding one wheel while ignoring sensed information regarding another wheel.

15. The method according to claim 1 comprising monitoring a change of the nominal effective radius over time and determining, based on the change, a depth of tire threads.

16. The method according to claim 1 wherein the distance passed by the vehicle is provided by a monitor located outside the vehicle.

17. The method according to claim 16 wherein the monitor a traffic camera.

18. The method according to claim 16 wherein the monitor is a satellite.

19. A non-transitory computer readable medium for estimating an effective radius of a tire of a vehicle, the non-transitory computer readable medium stores instructions for:
    obtaining sensed information that reflects (a) a distance passed by the vehicle during one or more driving sessions, (b) a rotational speed of at least a wheel that comprises the tire during the one or more driving sessions, (c) values of tire radius affecting parameters during the one or more driving sessions, wherein the tire radius affecting parameters comprise a vehicle speed;
    selecting at least one portion of the one or more driving sessions; and
    determining the effective radius of the tire of the vehicle based on (a) sensed information gained during the at least one portion, the sensed information comprises values of the tire radius affecting parameters during the at least one portion, and (b) one or more relationships between the effective radius of the tire and tire radius affecting parameters.

20. A system for estimating an effective radius of a tire of a vehicle, the system comprises at least one processor configured to:
    obtain sensed information that reflects (a) a distance passed by the vehicle during one or more driving sessions, (b) a rotational speed of at least a wheel that comprises the tire during the one or more driving sessions, (c) values of tire radius affecting parameters during the one or more driving sessions, wherein the tire radius affecting parameters comprise a vehicle speed;
    select at least one portion of the one or more driving sessions; and
    determine the effective radius of the tire of the vehicle based on (a) sensed information gained during the at least one portion, the sensed information comprises values of the tire radius affecting parameters during the at least one portion, and (b) one or more relationships between the effective radius of the tire and tire radius affecting parameters.

* * * * *